US008397987B2

(12) United States Patent  (10) Patent No.: US 8,397,987 B2
Nanjo  (45) Date of Patent: Mar. 19, 2013

(54) CARD WHICH CAN BE AUTHENTICATED BY HOLOGRAM CHIP

(75) Inventor: Shin-ichiro Nanjo, Tokyo (JP)

(73) Assignee: International Frontier Technology Laboratory, Inc., Tokyo (JP)

( * ) Notice: Subject to any disclaimer, the term of this patent is extended or adjusted under 35 U.S.C. 154(b) by 0 days.

(21) Appl. No.: 13/298,984

(22) Filed: Nov. 17, 2011

(65) Prior Publication Data

US 2012/0062966 A1    Mar. 15, 2012

Related U.S. Application Data

(63) Continuation of application No. 12/097,971, filed as application No. PCT/JP2006/325225 on Dec. 19, 2006.

(30) Foreign Application Priority Data

Dec. 19, 2005 (JP) ................................. 2005-365416
Jul. 24, 2006 (JP) ................................. 2006-200823

(51) Int. Cl.
*G06K 5/00* (2006.01)
*G06K 7/10* (2006.01)

(52) U.S. Cl. ........ 235/380; 235/451; 235/457; 235/491; 235/492

(58) Field of Classification Search .................. 235/375, 235/380, 449, 451, 487, 492–494, 457, 491
See application file for complete search history.

(56) References Cited

U.S. PATENT DOCUMENTS

| 5,946,288 | A | 8/1999 | Ogawa |
| 6,449,036 | B1 | 9/2002 | Wollmann et al. |
| 2002/0093122 | A1* | 7/2002 | Choi et al. ..................... 264/401 |
| 2002/0177144 | A1* | 11/2002 | Remacle et al. ................... 435/6 |
| 2003/0193845 | A1* | 10/2003 | Sano et al. ................. 369/13.11 |
| 2004/0179253 | A1 | 9/2004 | Hamano et al. |
| 2005/0157634 | A1 | 7/2005 | Nishiwaki et al. |
| 2008/0094974 | A1 | 4/2008 | Worthington |

FOREIGN PATENT DOCUMENTS

| CN | 1276332 A | 12/2000 |
| DE | 3827541 A1 | 2/1990 |
| DE | 4438460 A1 | 5/1996 |
| FR | 2859035 A1 | 2/2005 |
| JP | 63-104222 A | 5/1988 |
| JP | 63-183626 A | 7/1988 |
| JP | 01-191388 A | 8/1989 |

(Continued)

OTHER PUBLICATIONS

Chinese Office Action dated Mar. 23, 2010, issued in corresponding Chinese Patent Application No. 2006-80047648.

(Continued)

*Primary Examiner* — Tuyen K Vo
(74) *Attorney, Agent, or Firm* — Westerman, Hattori, Daniels & Adrian, LLP

(57) ABSTRACT

A card authentication is performed. An authentication chip for performing authentication by a copy-disabled hologram chip is attached to a card and when or after the card is introduced into a handling device, the authentication chip information is read to perform authentication. Read may be performed in a planar shape but a linear shape can reduce the processing load. An arbitrary straight line or a curved line may be used as a read line shape by modifying the read position in association with the card movement when the card is placed to be read. When the card introduced to a terminal device is an unauthorized one, the card is ejected or an alarm is issued when the card is introduced inside.

19 Claims, 36 Drawing Sheets

FOREIGN PATENT DOCUMENTS

| | | | |
|---|---|---|---|
| JP | 06-124866 A | 5/1994 |
| JP | 06-281425 A | 10/1994 |
| JP | 06-318282 A | 11/1994 |
| JP | 3013524 U | 5/1995 |
| JP | 07-220077 A | 8/1995 |
| JP | 07-272317 A | 10/1995 |
| JP | 08-011473 A | 1/1996 |
| JP | 09-319849 A | 12/1997 |
| JP | 10-044650 A | 2/1998 |
| JP | 10-143621 A | 5/1998 |
| JP | 11-003412 A | 1/1999 |
| JP | 11-025507 A | 1/1999 |
| JP | 11-180079 A | 7/1999 |
| JP | 11-272836 A | 10/1999 |
| JP | 11-311936 A | 11/1999 |
| JP | 2000-047557 A | 2/2000 |
| JP | 2000-048146 A | 2/2000 |
| JP | 2000-066567 A | 3/2000 |
| JP | 2000-123109 A | 4/2000 |
| JP | 2000-163530 A | 6/2000 |
| JP | 2000-298880 A | 10/2000 |
| JP | 2000-514581 A | 10/2000 |
| JP | 2001-236006 A | 8/2001 |
| JP | 2002-008245 A | 1/2002 |
| JP | 2002-40219 A | 2/2002 |
| JP | 2002-074283 A | 3/2002 |
| JP | 2002-279480 A | 9/2002 |
| JP | 2002-531880 A | 9/2002 |
| JP | 2002-341733 A | 11/2002 |
| JP | 2003-029636 A | 1/2003 |
| JP | 2003-223629 A | 8/2003 |
| JP | 2005-053091 A | 3/2005 |
| JP | 2005-205897 A | 8/2005 |
| JP | 2005-338638 A | 12/2005 |
| WO | 98-02849 A1 | 1/1998 |
| WO | 00-33142 A1 | 6/2000 |
| WO | 01-57859 A2 | 8/2001 |

OTHER PUBLICATIONS

Supplementary European Search Report dated Mar. 17, 2010, issued in corresponding European Patent Application No. 06834935.

"Handbook on the Technique to Prevent Forgery on the Surface of Affiliated IC Cards", published by the National Printing Bureau, the Ministry of Finance.

"Financial Business and Artifact-Metrics" published by the Institute for Monetary and Economics Studies, the Bank of Japan.

Nikkei Electronics; No. 883.

"The Patterns of Artifact-Metrics in Financial Field", 6th Information Security Symposium.

International Search Report dated Mar. 20, 2011 issued in PCT/2006/325225.

Japanese Office Action issued Feb. 21, 2012 in corresponding Japanese Patent Application 2007-551082. Partial Translation.

* cited by examiner

PRIOR ART

FIG. 2
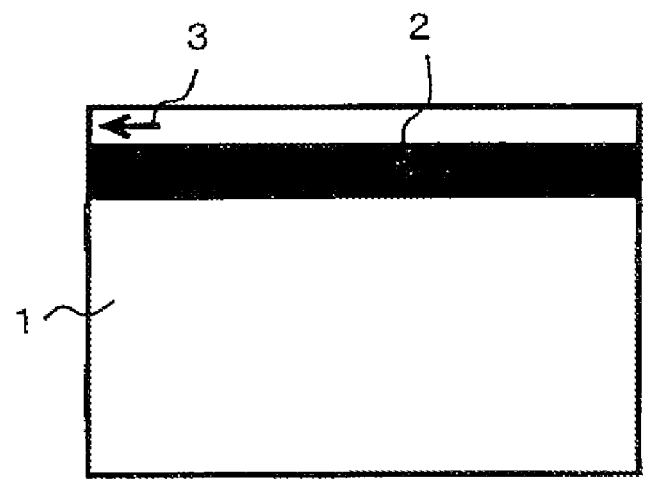
(a)
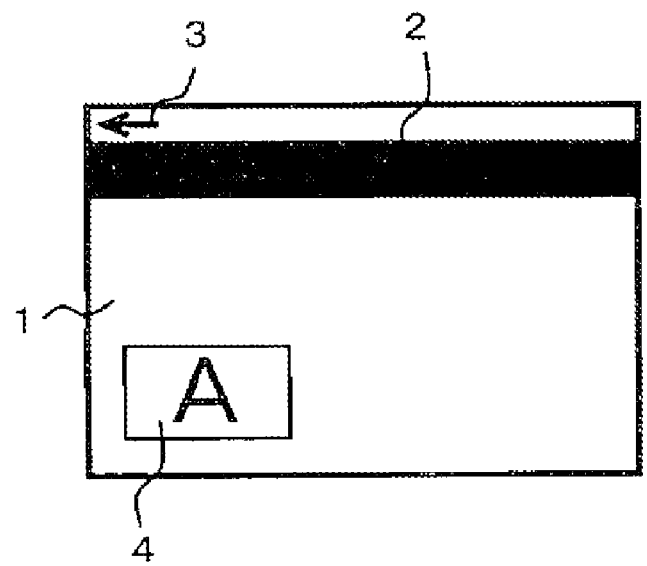
(b)
PRIOR ART

PRIOR ART

PRIOR ART

FIG. 5
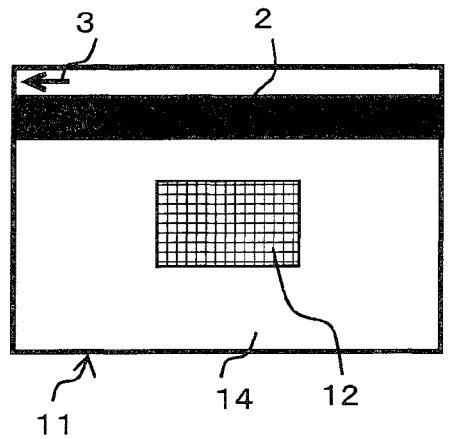
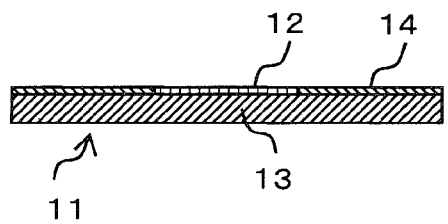
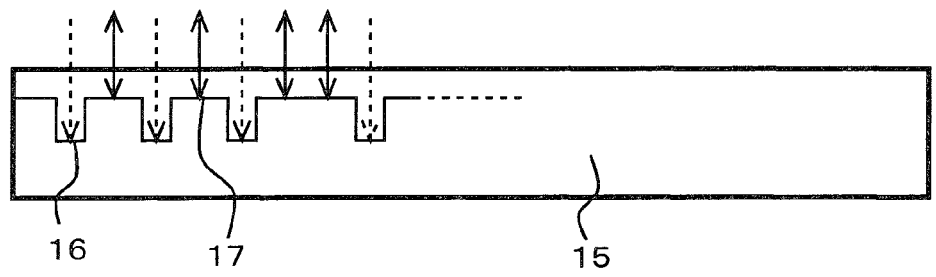
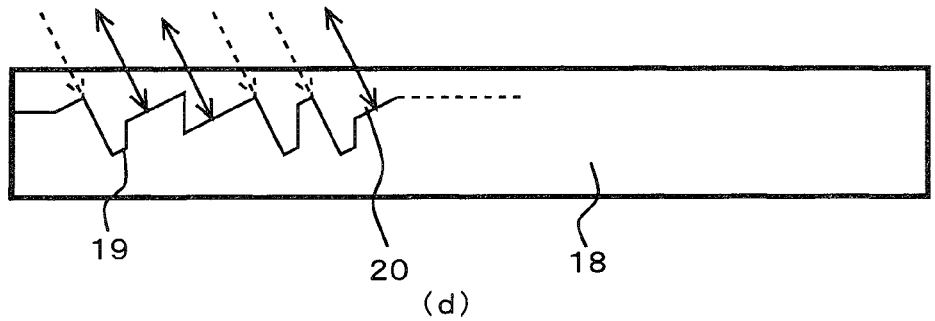
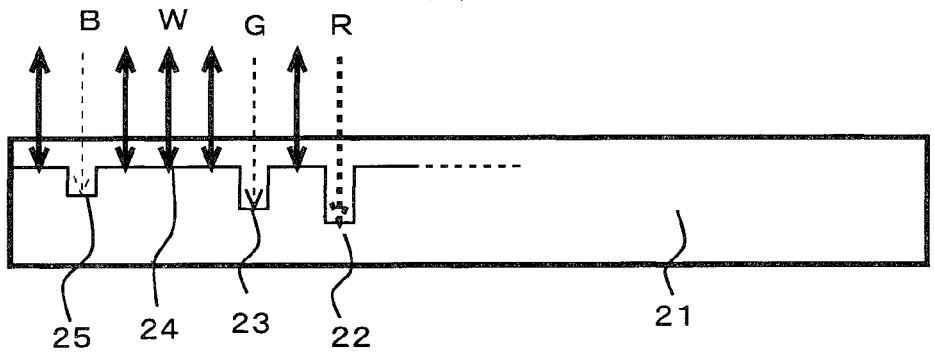

FIG. 6
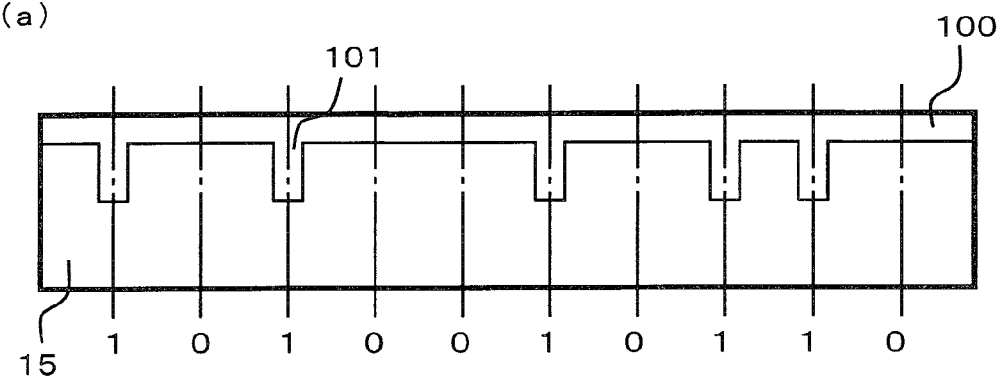
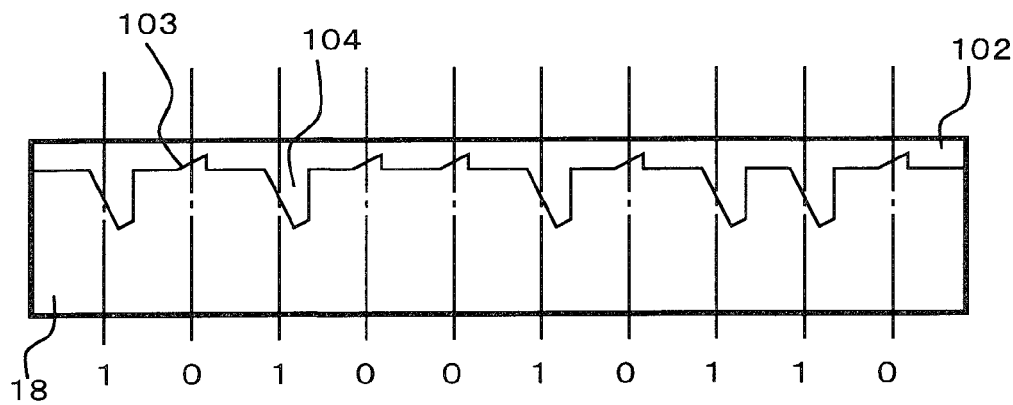
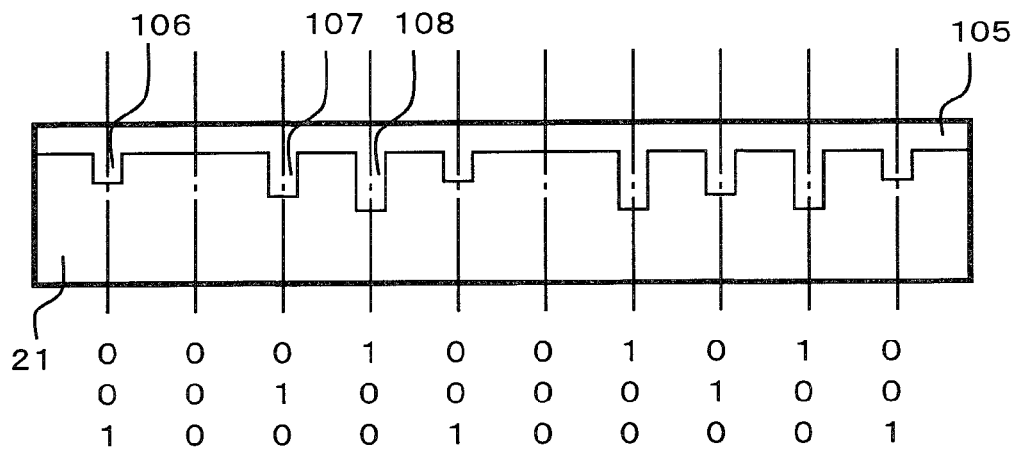

```
EB735F8B77390BA3428BFF01E89C84E3
C563C55BEE360E4158E27F95F912A631
D268E6324BB41C7FC33546EAAE879AB7
840027093C6F5EABCB2B9E76460006DA
DD8E863C19AC26CD9750B48D5CEFEFAE
8B4798AAE5ED101F3391F6B7301AF54B
A7DB0671296E6EE486B071B943BA0835
EF7C4FA238A256D4E893E9FEC87814E3
```

Fig. 10

| E | B | 7 | 3 | 5 | F | 8 | B |
|---|---|---|---|---|---|---|---|
| 7 | 7 | 3 | 9 | 0 | B | A | 3 |
| 4 | 2 | 8 | B | F | F | 0 | 1 |
| E | B | 7 | 3 | 5 | F | 8 | B |
| 7 | 7 | 3 | 9 | 0 | B | A | 3 |
| 4 | 2 | 8 | B | F | F | 0 | 1 |
| E | 8 | 9 | C | 8 | 4 | E | 3 |
| C | 5 | 6 | 3 | C | 5 | 5 | B |
| E | E | 3 | 6 | 0 | E | 4 | 1 |
| 5 | 8 | E | 2 | 7 | F | 9 | 5 |
| F | 9 | 1 | 2 | A | 6 | 3 | 1 |
| D | 2 | 6 | 8 | E | 6 | 3 | 2 |
| 4 | B | B | 4 | 1 | C | 7 | F |
| C | 3 | 3 | 5 | 4 | 6 | E | A |
| A | E | 8 | 7 | 9 | A | B | 7 |
| 8 | 4 | 0 | 0 | 2 | 7 | 0 | 9 |
| 3 | C | 6 | F | 5 | E | A | B |
| C | B | 2 | B | 9 | E | 7 | 6 |
| 4 | 6 | 0 | 0 | 0 | 6 | D | A |
| D | D | 8 | E | 8 | 6 | 3 | C |
| 1 | 9 | A | C | 2 | 6 | C | D |
| 9 | 7 | 5 | 0 | B | 4 | 8 | D |
| 5 | C | E | F | E | F | A | E |
| 8 | B | 4 | 7 | 9 | 8 | A | A |
| E | 5 | E | D | 1 | 0 | 1 | F |
| 3 | 3 | 9 | 1 | F | 6 | B | 7 |
| 3 | 0 | 1 | A | F | 5 | 4 | B |
| A | 7 | D | B | 0 | 6 | 7 | 1 |
| 2 | 9 | 6 | E | 6 | E | E | 4 |
| 8 | 6 | B | 0 | 7 | 1 | B | 9 |
| 4 | 3 | B | A | 0 | 8 | 3 | 5 |
| E | F | 7 | C | 4 | F | A | 2 |
| 3 | 8 | A | 2 | 5 | 6 | D | 4 |
| E | 8 | 9 | 3 | E | 9 | F | E |
| C | 8 | 7 | 8 | 1 | 4 | E | 3 |

HEXADECIMAL RANDOM MUMBERS GROUP b
7EDD7E7E7CD7DFD91AA59CD33ED11718
A982D1571419199DE37A9BC2C4D88D02
CB206356D9A624F85403C8525A822CB0
2590C020CBF7BBDF02112B9966B7CBF8
DCADB34B1D912D304FEE9F3D7FF8D7EC
5B5A505293EC1732E0B1845AE55B5720
55BCEA8129C1E5D043AE3A31076C8E1A
9EB0063128535 3D708F9C2C0FFEDCF7E

HEXADECIMAL RANDOM MUMBERS GROUP a
EB735F8B77390BA3428BFF01E89C84E3
C563C55BEE360E4158E27F95F912A631
D268E6324BB41C7FC33546EAAE879AB7
840027093C6F5EABCB2B9E76460006DA
DD8E863C19AC26CD9750B48D5CEFEFAE
8B4798AAE5ED101F3391F6B7301AF54B
A7DB0671296E6EE486B071B943BA0835
EF7C4FA238A256D4E893E9FEC87814E3

Fig. 14

BINARY RANDOM MUMBERS GROUP b 01, 11, 11, 10, 11, 01, 11, 01, 01, 11, 11, 10, 01, 11, 11, 10,
01, 11, 11, 00, 11, 01, 01, 11, 11, 01, 11, 11, 11, 01, 10, 01,
00, 01, 10, 10, 10, 10, 01, 01, 01, 10, 01, 11, 00, 11, 01, 00, 11,
00, 11, 11, 10, 11, 01, 00, 01, 00, 01, 01, 11, 00, 01, 10, 00,
10, 10, 10, 01, 10, 00, 00, 10, 11, 01, 00, 01, 01, 01, 01, 11,
00, 01, 01, 00, 00, 01, 10, 01, 00, 01, 10, 01, 10, 01, 11, 01,
11, 10, 00, 11, 01, 11, 10, 10, 10, 01, 10, 11, 11, 00, 00, 10,
11, 00, 01, 00, 11, 01, 10, 00, 10, 00, 11, 01, 00, 00, 00, 10,
11, 00, 10, 11, 00, 10, 00, 00, 01, 10, 00, 11, 01, 01, 01, 10,
11, 01, 10, 01, 10, 10, 01, 10, 00, 10, 01, 00, 11, 11, 10, 00,
01, 01, 01, 00, 00, 00, 00, 11, 11, 00, 10, 00, 01, 01, 00, 10,
01, 01, 10, 10, 10, 00, 00, 10, 00, 10, 11, 00, 10, 11, 00, 00,
00, 10, 01, 01, 10, 01, 00, 00, 11, 00, 00, 00, 00, 10, 00, 00,
11, 00, 10, 11, 11, 11, 01, 11, 10, 11, 10, 11, 11, 01, 11, 11,
00, 00, 00, 10, 00, 01, 00, 01, 00, 10, 10, 11, 10, 01, 10, 01,
01, 10, 01, 10, 10, 11, 01, 11, 11, 00, 10, 11, 11, 11, 10, 00,
11, 01, 11, 00, 10, 10, 11, 01, 10, 11, 00, 11, 01, 00, 10, 11,
00, 01, 11, 01, 10, 01, 00, 01, 00, 10, 11, 01, 00, 11, 00, 00,
01, 00, 11, 11, 11, 10, 11, 10, 10, 01, 11, 11, 00, 11, 11, 01,
01, 11, 11, 11, 11, 11, 10, 00, 11, 01, 01, 11, 11, 10, 11, 00,
01, 01, 10, 11, 01, 01, 10, 10, 01, 01, 00, 00, 01, 01, 00, 10,
10, 01, 00, 01, 11, 10, 11, 00, 00, 01, 11, 00, 11, 00, 10,
11, 10, 00, 00, 10, 11, 00, 01, 10, 00, 01, 00, 01, 01, 10, 10,
11, 10, 01, 01, 01, 01, 10, 11, 01, 01, 01, 11, 00, 10, 00, 00,
01, 01, 01, 01, 10, 11, 11, 00, 11, 10, 10, 10, 10, 00, 00, 01,
00, 10, 10, 01, 11, 00, 00, 01, 11, 10, 01, 01, 11, 01, 00, 00,
01, 00, 00, 11, 10, 10, 11, 10, 00, 11, 10, 10, 00, 11, 00, 01,
00, 00, 01, 11, 01, 10, 11, 00, 10, 00, 11, 10, 00, 01, 10, 10,
10, 01, 11, 10, 10, 11, 00, 00, 00, 00, 01, 10, 00, 11, 00, 01,
00, 10, 10, 00, 01, 01, 00, 11, 01, 01, 00, 11, 11, 01, 01, 11,
00, 00, 10, 00, 11, 11, 10, 01, 11, 00, 00, 10, 11, 00, 00, 00,
11, 11, 11, 11, 11, 10, 11, 01, 11, 00, 11, 11, 01, 11, 11, 10,

BINARY RANDOM MUMBERS GROUP a 11, 10, 10, 11, 01, 11, 00, 11, 01, 01, 11, 11, 10, 00, 10, 11,
01, 11, 01, 11, 00, 11, 10, 01, 00, 00, 10, 11, 10, 10, 00, 11,
01, 00, 00, 10, 10, 00, 10, 11, 11, 11, 11, 11, 00, 00, 00, 01,
11, 10, 10, 00, 10, 01, 11, 00, 10, 00, 01, 00, 11, 10, 00, 11,
11, 00, 01, 01, 01, 10, 00, 11, 11, 00, 01, 01, 01, 01, 10, 11,
11, 10, 11, 10, 00, 11, 01, 10, 00, 00, 11, 10, 01, 00, 00, 01,
01, 01, 10, 00, 11, 10, 00, 10, 01, 11, 11, 11, 10, 01, 01, 01,
11, 11, 10, 01, 00, 01, 00, 10, 10, 10, 01, 10, 00, 11, 00, 01,
11, 01, 00, 10, 01, 10, 10, 00, 11, 10, 01, 10, 00, 11, 00, 10,
01, 00, 10, 11, 10, 11, 01, 00, 00, 01, 11, 00, 01, 11, 11, 11,
11, 00, 00, 11, 00, 11, 01, 01, 01, 00, 01, 10, 11, 10, 10, 10,
10, 10, 11, 10, 10, 00, 01, 11, 10, 01, 10, 10, 10, 11, 01, 11,
10, 00, 01, 00, 00, 00, 00, 00, 10, 01, 11, 00, 00, 10, 01,
00, 11, 11, 00, 01, 10, 11, 11, 01, 01, 11, 10, 10, 10, 10, 11,
11, 00, 10, 11, 00, 10, 10, 11, 10, 01, 11, 10, 01, 11, 01, 10,
01, 00, 01, 10, 00, 00, 00, 00, 00, 01, 10, 11, 01, 10, 10,
11, 01, 11, 01, 10, 00, 11, 10, 10, 00, 01, 10, 00, 11, 11, 00,
00, 01, 10, 01, 10, 10, 11, 00, 00, 10, 01, 10, 11, 00, 11, 01,
10, 01, 01, 11, 01, 01, 00, 00, 10, 11, 01, 00, 10, 00, 11, 01,
01, 01, 11, 00, 11, 10, 11, 11, 11, 10, 11, 10, 10, 11, 11, 10,
10, 00, 10, 11, 01, 00, 01, 11, 10, 01, 10, 00, 10, 10, 10, 10,
11, 10, 01, 01, 11, 10, 11, 01, 00, 01, 00, 00, 00, 01, 11, 11,
00, 11, 00, 11, 10, 01, 00, 01, 11, 11, 01, 10, 10, 11, 01, 11,
00, 11, 00, 00, 00, 01, 10, 10, 11, 11, 01, 01, 01, 00, 10, 11,
10, 10, 01, 11, 11, 01, 10, 11, 00, 00, 01, 10, 01, 11, 00, 01,
00, 10, 10, 01, 01, 10, 11, 10, 01, 10, 11, 10, 11, 10, 01, 00,
10, 00, 01, 10, 10, 11, 00, 00, 01, 11, 00, 01, 10, 11, 10, 01,
01, 00, 00, 11, 10, 11, 10, 10, 00, 00, 10, 00, 00, 11, 01, 01,
11, 10, 11, 11, 01, 11, 00, 01, 00, 11, 11, 10, 10, 00, 10,
00, 11, 10, 00, 10, 00, 10, 01, 01, 01, 10, 01, 11, 01, 01, 00,
11, 10, 10, 00, 10, 01, 00, 11, 11, 10, 10, 01, 11, 11, 11, 10,
11, 00, 10, 00, 01, 11, 10, 00, 00, 01, 01, 00, 11, 10, 00, 11,

Fig. 15

QUATERNARY RANDOM MUMBERS GROUP b

```
R, B, B, G, B, R, B, R, R, B, B, G, R, B, B, G,
R, B, B, O, B, R, R, R, B, B, B, B, R, G, G, R,
O, R, G, G, G, G, R, R, R, G, R, B, O, B, R, B,
O, B, B, G, R, R, O, R, O, R, R, B, O, R, G, O,
G, G, G, R, G, O, O, G, B, R, O, R, R, R, R, B,
O, R, R, O, O, R, G, R, O, R, G, R, G, R, B, R,
B, G, O, B, R, B, G, G, G, R, G, B, B, O, O, G,
B, O, R, O, R, B, R, G, O, G, O, B, R, O, O, G,
B, O, G, B, O, G, O, O, R, G, O, B, R, R, O, G,
B, R, G, R, G, G, R, G, O, G, R, O, B, B, G, O,
R, R, R, R, O, O, O, O, B, B, O, G, O, R, R, O, G,
R, R, G, G, G, O, O, O, G, O, B, O, G, B, O, O,
O, G, R, R, G, R, O, O, B, O, O, O, O, G, O, O,
B, O, G, B, B, B, R, B, G, B, G, B, B, R, B, B,
O, O, O, G, O, R, O, R, O, G, G, B, G, R, G, R,
R, G, R, G, G, B, R, B, B, O, G, B, B, B, G, R, O, B,
B, R, B, O, G, B, R, B, G, B, O, B, R, O, G, B,
O, R, B, R, G, R, O, R, O, G, B, R, O, B, O, O,
R, O, B, B, B, G, B, G, G, R, B, B, O, B, B, R,
R, B, B, B, B, B, G, O, B, R, R, B, B, G, B, O,
R, R, G, R, B, R, G, G, R, R, O, O, R, R, O, G,
G, R, O, B, B, G, B, O, O, R, B, O, R, B, O, G,
B, G, O, O, B, O, R, G, O, R, O, R, R, O, G, G,
B, G, R, R, R, R, G, B, R, R, R, B, O, G, O, O,
R, R, R, R, G, B, B, O, B, G, G, G, G, O, O, R,
O, G, G, R, B, O, O, R, B, G, R, R, B, R, O, R,
R, O, O, B, G, O, B, G, O, B, G, O, B, O, R,
O, O, R, B, R, G, B, O, G, O, B, G, O, R, G, R,
G, R, B, G, G, B, O, O, O, O, R, G, O, B, O, R,
O, G, G, O, R, R, O, B, R, R, O, B, B, R, R, B,
O, O, G, O, B, B, G, R, B, O, O, G, B, O, O, O,
B, B, B, B, B, G, B, R, B, O, B, B, R, B, B, G,
```

QUATERNARY RANDOM MUMBERS GROUP a

|   | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|----|----|----|----|----|----|----|----|----|----|----|----|----|----|----|----|----|----|----|----|----|----|
| 0 | R | B | B | G | B | R | B | R | R | B | B | G | R | B | B | G | R | B | B | 0 | B | R | R | B | B | R | B | B | B | R | G | R |
| 1 | 0 | R | G | G | G | G | R | R | G | R | B | 0 | B | R | 0 | B | 0 | B | B | G | B | R | 0 | R | 0 | R | R | B | 0 | R | G | 0 |
| 2 | G | G | G | R | G | 0 | 0 | G | B | R | 0 | R | R | R | B | 0 | R | R | 0 | 0 | R | G | R | 0 | R | G | R | G | R | B | R |
| 3 | B | G | 0 | B | R | B | G | G | G | R | G | B | B | 0 | 0 | G | B | 0 | R | 0 | B | R | G | 0 | G | 0 | B | R | 0 | 0 | 0 | G |
| 4 | B | 0 | G | B | 0 | G | 0 | 0 | R | G | 0 | B | R | R | R | G | B | R | G | R | G | G | R | G | 0 | G | R | 0 | B | B | G | 0 |
| 5 | R | R | R | 0 | 0 | 0 | 0 | B | B | 0 | G | 0 | R | R | 0 | G | R | R | G | G | G | 0 | 0 | G | 0 | G | B | 0 | G | B | 0 | 0 |
| 6 | 0 | G | R | R | G | R | 0 | 0 | B | 0 | 0 | 0 | 0 | G | 0 | 0 | B | 0 | G | B | B | B | R | B | G | B | G | B | B | R | B | B |
| 7 | 0 | 0 | 0 | G | 0 | R | 0 | R | 0 | G | G | B | G | R | G | R | R | G | R | G | G | B | R | B | B | 0 | G | B | B | B | G | 0 |
| 8 | B | R | 0 | G | G | B | R | G | B | 0 | B | R | 0 | G | B | 0 | R | B | R | G | R | 0 | R | 0 | G | B | R | 0 | B | 0 | 0 |
| 9 | R | 0 | B | B | B | G | B | G | G | R | B | B | 0 | B | B | R | R | B | B | B | B | G | 0 | B | R | R | B | B | G | B | 0 |
| 10 | R | R | G | B | R | R | G | G | R | R | 0 | 0 | R | R | 0 | G | G | R | 0 | B | B | G | B | 0 | 0 | R | R | B | 0 | B | 0 | G |
| 11 | B | G | 0 | 0 | G | B | 0 | R | G | 0 | R | 0 | R | R | G | G | B | G | R | R | R | R | G | B | R | R | R | B | 0 | G | 0 | 0 |
| 12 | R | R | R | R | G | B | B | 0 | B | G | G | G | G | 0 | 0 | R | 0 | G | G | R | B | 0 | 0 | R | B | G | R | R | B | R | 0 | 0 |
| 13 | R | 0 | 0 | B | G | G | B | G | 0 | B | G | G | 0 | B | 0 | R | 0 | 0 | R | B | R | G | B | 0 | G | 0 | B | G | 0 | R | G | G |
| 14 | G | R | B | G | G | B | 0 | 0 | 0 | 0 | R | G | 0 | B | 0 | R | 0 | G | G | 0 | R | R | 0 | B | R | R | 0 | B | B | R | R | B |
| 15 | 0 | 0 | G | 0 | B | B | G | R | B | 0 | 0 | G | B | 0 | 0 | 0 | B | B | B | B | G | B | R | B | 0 | B | B | R | B | B | G |
| 16 | B | G | G | B | R | B | 0 | B | R | R | B | B | G | 0 | G | B | R | B | R | B | 0 | B | G | R | 0 | 0 | G | B | G | G | 0 | B |
| 17 | R | 0 | 0 | G | G | 0 | G | B | B | B | B | B | 0 | 0 | 0 | R | B | G | G | 0 | G | R | B | 0 | G | 0 | R | 0 | B | G | 0 | B |
| 18 | B | 0 | R | R | R | G | 0 | B | B | 0 | R | R | R | G | B | B | G | B | G | 0 | B | R | G | 0 | 0 | B | G | R | 0 | 0 | R |
| 19 | R | R | G | 0 | B | G | 0 | G | R | B | B | B | G | R | R | R | B | B | G | R | 0 | R | 0 | G | G | G | R | G | 0 | B | 0 | R |
| 20 | B | R | 0 | G | R | G | G | 0 | B | G | R | G | 0 | B | 0 | G | R | 0 | G | B | G | B | R | 0 | 0 | R | B | 0 | R | B | B | B |
| 21 | B | 0 | 0 | B | 0 | B | R | R | R | 0 | R | G | B | G | G | G | G | B | G | G | 0 | R | B | G | R | G | G | G | B | R | B |
| 22 | G | 0 | R | 0 | 0 | 0 | 0 | 0 | 0 | G | R | B | 0 | 0 | G | R | 0 | B | B | 0 | R | G | B | B | R | R | B | G | G | G | G | B |
| 23 | B | 0 | G | B | 0 | G | G | B | G | R | B | G | R | B | R | G | R | 0 | R | G | 0 | 0 | 0 | 0 | 0 | R | G | B | R | G | G |
| 24 | B | R | B | R | G | 0 | B | G | G | 0 | R | G | 0 | B | B | 0 | 0 | R | G | R | G | G | B | 0 | 0 | G | R | G | B | 0 | B | R |
| 25 | G | R | R | B | R | R | 0 | 0 | G | B | R | 0 | G | 0 | B | R | R | R | B | 0 | B | G | B | B | B | G | B | B | G | G | B | G |
| 26 | G | 0 | G | B | R | 0 | R | B | G | R | G | 0 | G | G | G | G | B | G | R | R | B | G | B | R | 0 | R | 0 | 0 | 0 | R | B | B |
| 27 | 0 | B | 0 | B | G | R | 0 | R | B | B | R | G | G | B | R | B | 0 | B | 0 | 0 | 0 | R | G | G | B | B | R | R | R | 0 | G | B |
| 28 | G | G | R | B | B | R | G | B | 0 | 0 | R | G | R | B | 0 | R | 0 | G | G | R | R | G | B | G | R | G | B | G | B | G | R | 0 |
| 29 | G | 0 | R | G | G | B | 0 | 0 | R | B | 0 | R | G | B | G | R | R | 0 | 0 | B | G | B | G | G | 0 | 0 | G | 0 | 0 | B | R | R |
| 30 | B | G | B | B | R | B | B | 0 | R | 0 | B | B | G | G | 0 | G | 0 | B | G | 0 | G | 0 | G | R | R | R | G | B | R | R | 0 |
| 31 | B | G | G | 0 | G | R | 0 | B | B | G | G | R | B | B | B | G | B | 0 | G | 0 | R | B | G | 0 | 0 | R | R | 0 | B | G | 0 | B |

| D00 |
|---|
| D01 |
| D02 |
| D03 |
| D04 |
| D05 |
| D06 |
| D07 |
| D08 |
| D09 |
| D10 |
| D11 |
| D12 |
| D13 |
| D14 |
| D15 |
| D16 |
| D17 |
| D18 |
| D19 |
| D20 |
| D21 |
| D22 |
| D23 |
| D24 |
| D25 |
| D26 |
| D27 |
| D28 |
| D29 |
| D30 |
| D31 |

(b)

| D00 | |
|---|---|
| | D01 |
| D02 | |
| | D03 |
| D04 | |
| | D05 |
| D06 | |
| | D07 |
| D08 | |
| | D09 |
| D10 | |
| | D11 |
| D12 | |
| | D13 |
| D14 | |
| | D15 |
| D16 | |
| | D17 |
| D18 | |
| | D19 |
| D20 | |
| | D21 |
| D22 | |
| | D23 |
| D24 | |
| | D25 |
| D26 | |
| | D27 |
| D28 | |
| | D29 |
| D30 | |
| | D31 |

FIG. 23

| R00 | G00 | B00 |
|-----|-----|-----|
| R01 | G01 | B01 |
| R02 | G02 | B02 |
| R03 | G03 | B03 |
| R04 | G04 | B04 |
| R05 | G05 | B05 |
| R06 | G06 | B06 |
| R07 | G07 | B07 |
| R08 | G08 | B08 |
| R09 | G09 | B09 |
| R10 | G10 | B10 |
| R11 | G11 | B11 |
| R12 | G12 | B12 |
| R13 | G13 | B13 |
| R14 | G14 | B14 |
| R15 | G15 | B15 |
| R16 | G16 | B16 |
| R17 | G17 | B17 |
| R18 | G18 | B18 |
| R19 | G19 | B19 |
| R20 | G20 | B20 |
| R21 | G21 | B21 |
| R22 | G22 | B22 |
| R23 | G23 | B23 |
| R24 | G24 | B24 |
| R25 | G25 | B25 |
| R26 | G26 | B26 |
| R27 | G27 | B27 |
| R28 | G28 | B28 |
| R29 | G29 | B29 |
| R30 | G30 | B30 |
| R31 | G31 | B31 |

FIG. 24
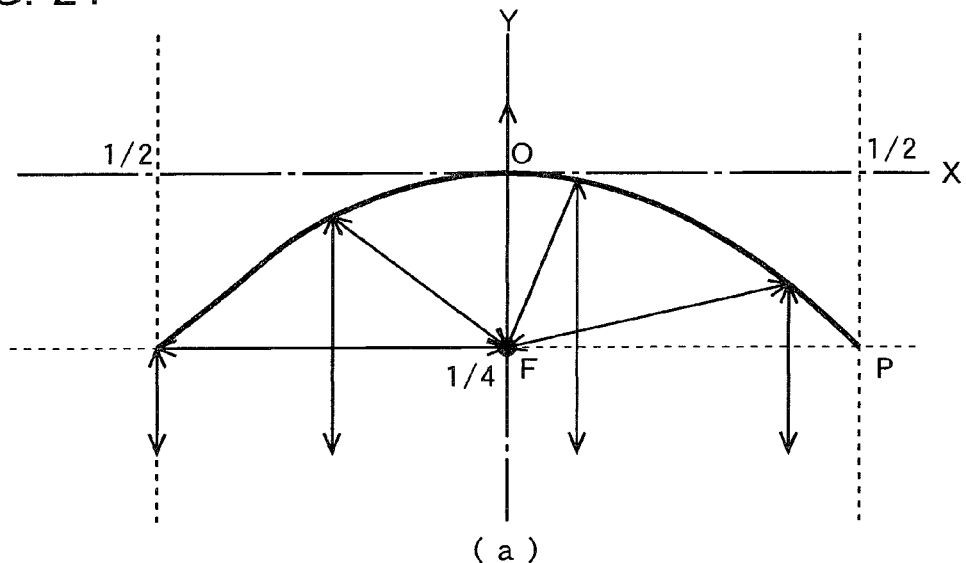
(a)
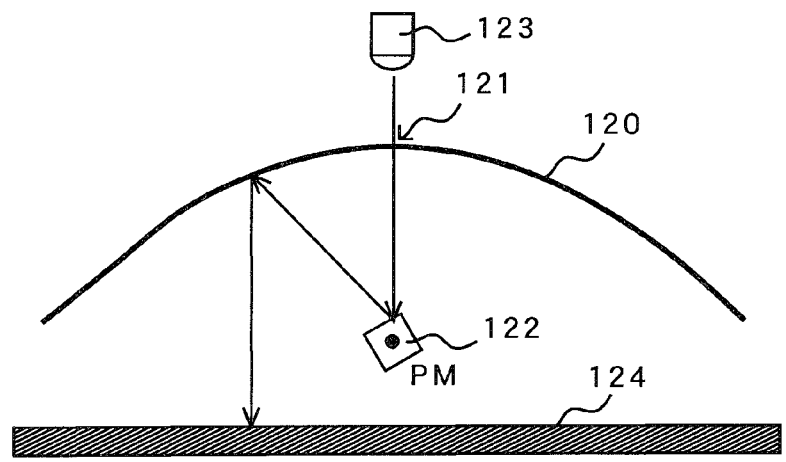
(b)
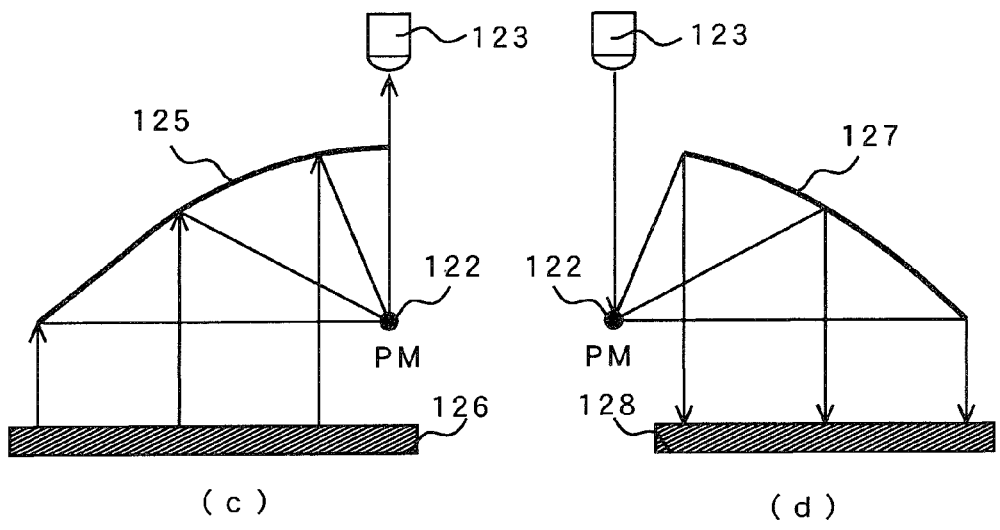
(c)     (d)

FIG. 28
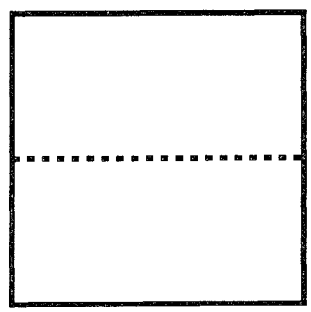
(a)
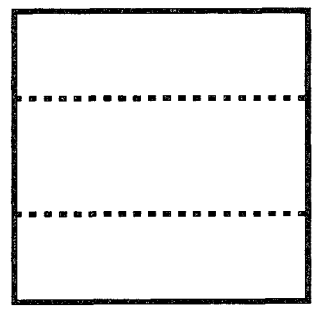
(e)
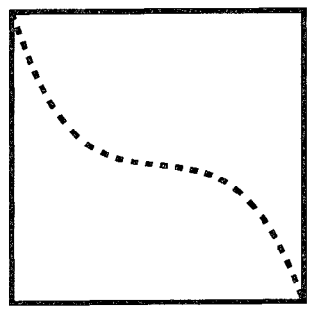
(b)
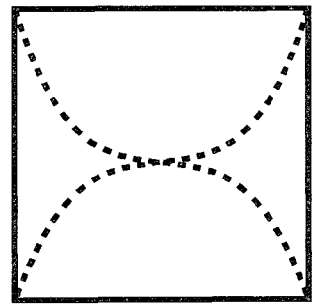
(f)
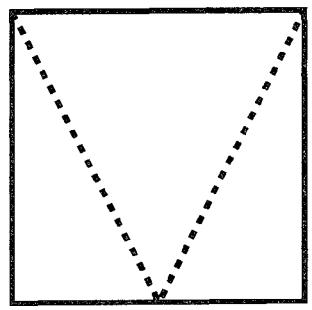
(c)
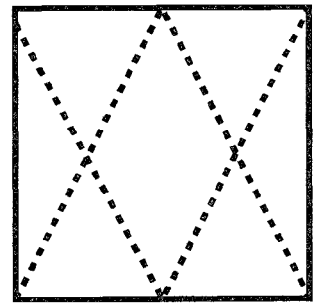
(g)
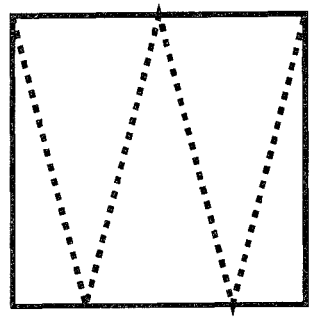
(d)
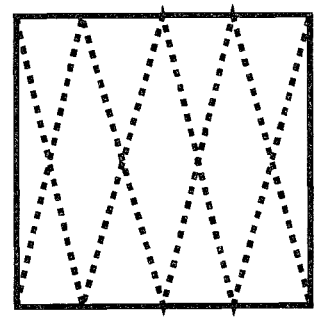
(h)

CARD WHICH CAN BE AUTHENTICATED BY HOLOGRAM CHIP

CROSS-REFERENCE TO RELATED APPLICATIONS

This application is a continuation of U.S. application Ser. No. 12/097,971 filed on May 26, 2009, which is a National Stage Application of PCT/2006/325225 filed on Dec. 19, 2006, which is based on and claims the benefit of priority from Japanese Patent Application Nos. 2005-365416, filed on Dec. 19, 2005 and 2006-200823, filed on Jul. 24, 2006, the entire contents of which are hereby incorporated by reference.

FIELD OF THE INVENTION

The present invention relates to a structure of an object such as a card, a bank note, securities, etc., which is often forged or counterfeited and which requires authentication to check whether it is authentic or not. The invention also relates to a method for identifying authenticity of such the object.

BACKGROUND ART

In the present-day society, which is often called a card-oriented society, a great number of different types of cards are widely propagated. Specifically, a cash card and a credit card issued by a credit company which are relating to the assets of property owners and a prepaid card as securities, and identification cards such as a driver's license, a health insurance card and a passport are widely used.

In many of the cards relating to property or securities and bonds, necessary information is written on a magnetic stripe disposed on the surface or on the rear surface of the card. By using automatic machines such as an ATM (automated teller machine) or a manual reading device, the magnetic information is read from the magnetic stripe, and various types of processing are executed.

FIG. 1 shows an example of a flow of processing the cash card currently in use.

(1) When an owner of a card inserts the cash card into a card slot of a terminal device such as an ATM, a sensor at the card slot senses the inserted card, and the card is taken into the device.

(2) When the card is taken into the device, the terminal device reads card information from a magnetic recording portion of the card. In case of a cash card, the card information such as a bank code, a bank branch code, a type of account, an account number, etc. is read. A card identification number, the expiration date, a type of account and an account number are recorded as the card information on the magnetic recording portion of a credit card. If a personal identification number is recorded on a cash card or a credit card, the personal identification number is also read.

(3) The terminal device judges whether or not the inserted card is a valid card, which can be handled by the terminal device.

(4) If it is not confirmed that the card can be handled by the device from the card information thus read, or if the information on the card cannot be read because the card is broken or stained even though the card is a valid card, the terminal device judges that it is an invalid card which cannot be handled and discharges the card.

(5) When the card is a valid card and when the information on the magnetic recording portion of the card has been read correctly, communication with a host computer starts.

(6) The host computer requests the inputting of the personal identification number.

(7) In response to the request from the host computer, the card user inputs the personal identification number.

(8) When the card user inputs the personal identification number in response to the request of the host computer, the host computer compares the inputted personal identification number with the personal identification number which is stored in the host computer and which corresponds to the card information thus read.

(9) If the numbers differ, this fact is recorded on the magnetic recording portion of the card, and the inputting of the personal identification number is requested again. In a case where the personal identification number inputted again is proper and valid, subsequent procedure is carried out. In a case where the inputted number differs from the stored number, the inputting of the personal identification number is requested further again. If erroneous inputting of the personal identification number is repeated three times, the card is invalidated and is, for example, taken into the terminal device as the result of invalidation procedure.

(10) In a case where the personal identification numbers are equal, the host computer judges that the card user is a legitimate card owner and requests the user to input the amount to be paid.

(11) The user inputs the amount which he(she) wishes to draw.

(12) When the amount to be paid is proper, the amount is paid and the cash card is discharged from the terminal device. Then, the payment is recorded on a bankbook, or a slip indicating the dealing is issued, and the processing finishes.

If the personal identification number is recorded on the cash card, the dealing is carried out under the assumption that the personal identification number is valid. Then, the personal identification number is erased from the magnetic recording portion.

FIG. 2(*a*) illustrates an example of the cash card used in the processing flow of the currently used cash card as shown in FIG. 1. The reference number 1 shows a cash card body made of a material such as plastics. On the surface of the card, a magnetic stripe 2 where information is recorded and an arrow mark 3 to indicate the direction to insert the cash card are disposed. Although not shown in the drawing, other necessary matters are entered thereon by embossed characters.

As information written in the magnetic stripe can be easily read by using a device called a skimmer, the card may be forged, and often causes damage by using the card thus forged.

To cope with this problem, an IC card incorporating a semiconductor memory has been used. Banks and other organizations have been making efforts to propagate this type of card to replace the magnetic card.

However, the information stored in the memory of the IC card is still possible to be read. If more elaborate forgery is attempted, we may not be able to say that the IC card is absolutely safe. In addition, the IC card is very expensive compared to the magnetic card, and it would be hard to expect the rapid propagation of IC cards.

In case of the cash card used in banks, it would suffice if the card can be used within the boundary of one country. However, in case of the credit card, the card is necessary to be used also in foreign countries. It is practically impossible to replace all of the credit cards, i.e. magnetic cards, used in the whole world with IC cards under unified standards.

Further, in cash cards and credit cards, the information such as the name of the card owner is marked by embossing, and these types of information are also used for the magnetic information. In this respect, the embossed information may be used as a clue or a key in the preparation for forging a card.

If the magnetic card or the IC card is lost or stolen, and if the card returned into the hand of the card owner, in particular, when the card owner does not aware of the fact of stealing, it is liable to cause damage by the use of the forged card.

A personal identification number, consisting of 4-digit numbers, has been used not for preventing cards from being illegitimately used by the prevention of the forgery but as the means to determine whether or not the card user is proper. Since assumable numbers have been often used for these personal identification numbers, there have been many cases of the loss and damage. In recent years, the personal identification number is stolen not only by assumption of it but also by peeping such as the means of stealthily taking a photograph of the personal identification number. It is now very difficult to prevent the illegitimate use of cards by using the personal identification number.

For the purpose of preventing the damage caused by the forged card, some adopts the biometric technique using the pattern recognition technology. The typical examples of the biometric technique are iris recognition, fingerprints recognition, palm-prints recognition, finger vein recognition, palm vein recognition, and hand-back vein recognition. For these recognition, it is necessary to register the pattern in advance. Time and procedures are required for the registration of the pattern, and also time is needed for the recognition of the pattern itself and for determining, and that results higher costs.

In case of the contact-type recognition, the user must come into direct contact with the detection device, and there arises a problem that the user may feel physiological repugnance or disgust. Also, in a case where the user has injury on the physical part necessary for the biometrical recognition, or in the worst case, where the user has lost the physical part to be needed for the recognition, it is impossible to use the biometrical recognition. Also, the recognition is partially made during the process of identifying, and accordingly, it is not a perfect method.

In the system using the biometrical recognition, the card user himself or herself can only use his or her own card. When the card user has not enough time to use the card personally or does not find a card processing device nearby, even if the user wants to entrust a representative or an agent to use the card, it is not allowed. This is very inconvenient for the user.

As one of the means for preventing the forgery, an embossed hologram is mounted to form surface irregularities on the plastic surface in case of credit cards, prepaid cards, securities, etc. This embossed hologram is very difficult to duplicate. In this respect, it is actually impossible to forge the card provided with the embossed hologram. In the current condition of the use, however, it is a person, who read the embossed hologram at a glance. Thus, it is possible that the card is forged by using the embossed hologram of similar type.

FIG. 2(b) illustrates an example of a credit card with the hologram, on which the card authentication is verified according to the human sense. The reference numeral 1 shows a credit card body made of a material such as plastics. On the surface of the card, a magnetic stripe 2 where information is recorded and an arrow mark 3 to indicate the direction to insert the credit card are disposed. Although not shown in the drawing, other necessary matters are entered thereon by embossed characters.

This credit card 1 is inserted into a terminal device with a portion with the arrow mark placed at the foremost position. Near the foremost portion on the card, an authentication verifying chip 4 consisted of, for example, an embossed hologram is mounted.

The magnetic stripe is disposed, unlike the cash card, on the rear surface of the credit card, but the direction to insert the card into the terminal device is the same. As a result, the direction to read the magnetic information on the credit card is reverse to that of the cash card.

In the authentication verifying chip 4, a pattern "A", as an example, is confirmed by a person, who inserts the card into the terminal device, visually, i.e. by sensuous means, but is not read by the card terminal device.

The authentication verifying by sensuous means provides high effects in primary screening but its reliability is low because there are variations in the ability of each individual person who confirms and identifies or there are also variations in the identifying environment and psychological and/or physical conditions of the person.

The method for reading the embossed hologram pattern by machine can be roughly divided as a method for reading an image in a planar shape by means such as a camera; and a method for reading data in a linear shape by the combination of light emitting elements and light detecting elements. The method for reading the image in the planar shape is effective for verifying the authenticity, while the amount of information to be processed is large and the device for this method is more complicated.

The arrangements for reading data in the linear shape are disclosed in Japanese Patent Laid-Open Publication Nos. H06-124866, H06-318282, H07-220077, H09-319849, H11-180079, H10-143621, 2000-47557, 2000-48146 and 2002-74283.

According to each of the methods described in these references, the embossed hologram is read along a straight line in longitudinal direction of a rectangular shape card where the embossed hologram or a diffraction grating is formed. As a result, the device used is relatively simple in structure and it is easy to use, however, is less resistant to forgery.

In addition to the above references, Japanese Patent Laid-Open Publication No. H11-272836 discloses an identification technique using a diffraction grating, Japanese Patent Laid-Open Publication No. 2002-279480 discloses an identification technique using embossed hologram and moire, and Japanese Patent Laid-Open Publication No. 2002-341733 discloses an identification technique using embossed hologram and latent image.

The arrangements for reading data in the linear shape are disclosed in Japanese Patent Laid-Open Publication Nos. H06-124866, H06-318282, H07-220077, H09-319849, H11-180079, H10-143621, 2000-47557, 2000-48146 and 2002-74283.

According to each of the methods described in these references, the embossed hologram is read along a straight line in longitudinal direction of a rectangular shape card where the embossed hologram or a diffraction grating is formed. As a result, the device used is relatively simple in structure and it is easy to use, however, is less resistant to forgery.

In addition to the above references, Japanese Patent Laid-Open Publication No. H11-272836 discloses an identification technique using a diffraction grating, Japanese Patent Laid-Open Publication No. 2002-279480 discloses an identification technique using embossed hologram and moire, and Japanese Patent Laid-Open Publication No. 2002-341733 discloses an identification technique using embossed hologram and latent image.

When verifying the authentication by using an auxiliary tool, it is carried out by ultra-fine lines, special lines and micro-characters by using a screen with special shape, a magnifying device such as a magnifying glass or a special type filter generating optical interferences.

Practically, a light-emitting base material or a material having a special optical property such as a light-emitting laminated film, light-emitting ink, thermo-chromic ink, photo-chromic ink, etc., is mixed into the base material, laminated film or ink and the auxiliary tool of a special filter, a ultra-violet ray lamp, etc. is used. However, these are also low in reliability because recognition and identification are consequently relying on the human sense.

The authentication verifying by mechanical processing is to verify authenticity by mechanically detecting the property of the object material. The magnetic property and the optical property may be used for the detection.

Practically, a light-emitting material or a magnetic material is mixed into a base material, laminated film or ink and a detection device is used. Or, specific coded information is magnetically or optically added by using OCR characters or magnetic barcodes, and a magnetic or optical detection device is used.

In the authentication verifying by the mechanical processing, an artifact-metrics system using an artifact without having reproducibility, randomly arranged in a medium, is used instead of the information specific to the living body. This is described in "Financial Business and Artifact-Metrics" published by the Institute for Monetary and Economic Studies, the Bank of Japan (http://www.imes.boj.or.jp/japanese/jdps/2004/044-12.pdf) and "The Patterns of Artifact-Metrics in Financial Field"; 6th Information Security Symposium (http://www.imes.boj.or.jp/japanese/kinyu/2004/kk23-2-6.pdf).

In the artifact-metrics system, a light reflecting pattern of granular substances, a transmission light pattern of optical fibers, a parallax image pattern of polymer fibers, a fiber image pattern, a magnetic pattern of magnetic fibers, a random-recorded magnetic pattern, a random magnetic pattern of a magnetic stripe, a random electric charge pattern of a memory cell, a resonance pattern of electrically conductive fibers, a resonance pattern of a vibrating seal, etc., which are formed by chance, are used.

As the matters subject to the illegitimate use or the forgery of the card, "the information of the descriptions of the card" added when the card is issued to a user and "the information of the card" given to the card in the manufacturing process are included. ("Handbook on the Technique to Prevent Forgery on the Surface of Affiliated IC Cards", published by the National Printing Bureau, the Ministry of Finance (see: http://www.npb.go.jp/ja/info/ichb.pdf).

The information of the descriptions of the card is the information which is accorded and printed on the card body when issued to the user, and which is relating to the card issuance such as the card owner information, the period of validity, etc.

Falsification, which is a typical act of the illegitimate use of the card, is an act to alter all or a part of the information of the descriptions of the card, done by erasing the genuine information and adding illegitimate information.

The information of the card is the information of the card itself, other than the information of the descriptions of the card in the issued card. It is the information relating to the card body such as the physical shape of the card, background patterns applied to the card in pre-printing factory, printing layer on underlying layer and protected laminated layer, etc.

Forgery is an illegal act carried out for the card body. It is carried out by duplicating or imitating the design, patterns, etc., relating to the card body to forge a card, which is similar to the authentic card in the external appearance. Actually, the design, patterns, etc. on the surface of the authentic card are read by the means such as a scanner, which are then, edited or amended by using the means such as a printer.

Many types of techniques to prevent the forgery of the card body are known through combining the printing mode, types of ink, printing patterns, etc., only in the printing art, but no decisive technique is known yet at present.

The methods for authentication verifying to recognize and identify the forgery can be roughly classified as a method based on human sensuous ability; a method using auxiliary tools; and a method by mechanical processing.

In the authentication verifying by the human sensuous ability, the authenticity of a card is identified by the sensuous ability such as the visual sense, the tactile sense, etc. The means to identify by the visual sense includes colors of the card itself, a watermark and an embossed hologram, which changes the color and patterns provided on the card by changing the viewing angle. The means to identify by the tactile sense includes detecting the surface irregularities added on the card and detecting the texture of the card body itself. Actually, a logo mark, a special font, printing lines for preventing duplication, special color ink, embossed hologram, an optically changing material, a latent image pattern, etc., which are difficult to duplicate or copy and in which the authenticity of the card can be easily identified by the visual sense are used. And embossing, surface irregularities, perforation, etc. are also used, on which the authenticity can be identified by finger feeling or by the visual sense.

FIG. 3 shows a conventional example of a card, to which an authentication verifying chip of an artifact-metrics chip using metal granules is mounted as disclosed in Japanese Patent Laid-Open Publication no. 10-44650. FIG. 3($a$) is a general view, FIG. 3($b$) is a cross-sectional view and FIG. 3($c$) is an enlarged view of the artifact-metrics chip.

In the card 1, the artifact-metrics chip 4 in thin-plate shape made of a light transmitting resin mixed with metal granules 5 is layered on a card base member 7, having a light non-transmitting property, which has an opening for the authentication verifying chip on it. And a non-transparent card surface plate 6 is further layered, in which a magnetic stripe 2 and an arrow mark 3 are formed thereon and another opening is arranged at the same position as the opening on the card base member 7.

The metal granules 5 are mixed three-dimensionally in the transparent resin without regularity. As a result, the arrangement pattern of the metal granules 5 observed through the opening is inherent in each of the artifact-metrics chip 4. By utilizing these characteristics, a light to pass through the artifact-metrics chip 4 is photographed via the opening, and the arrangement pattern of the metal granules 5 can be observed. Therefore, it is possible to identify each individual artifact-metrics chip 4 and then, the card.

FIG. 4 shows another conventional example of a card, to which an artifact-metrics chip using fibers as disclosed in Japanese Patent Laid-Open Publication No. 2003-29636. FIG. 4($a$) is a general view, FIG. 4($b$) is a cross-sectional view and FIG. 4($c$) is an enlarged view of the artifact-metrics chip.

In the card, the artifact-metrics chip 8 containing a mesh member 9 and short fibers 10 three-dimensionally mixed in a transparent resin is placed into an opening of the card base member 1, which has a non-transparent property and a magnetic stripe 2 and an arrow mark 3 are disposed on the surface thereof. On the artifact-metrics chip 8, an interference pattern is generated by the pattern of the mesh member 9 and the short fibers 10.

This interference pattern is inherent in each of the artifact-metrics chip 8, i.e., in each card. By utilizing this characteristic, the pattern of the artifact-metrics chip 8 of the authentication verifying chip is photographed by a transmitted light or a reflected light for the card to be identified.

Mechanical reading of such the pattern of biometrics or artifact-metrics is generally performed by an image-pickup device and the result is identified by a pattern recognition technique. In this respect, there is a possibility that forgery can be made according to a duplicating technique.

The arrangements for reading data in the linear shape are disclosed in Japanese Patent Laid-Open Publication Nos. H06-124866, H06-318282, H07-220077, H09-319849, H11-180079, H10-143621, 2000-47557, 2000-48146 and 2002-74283.

According to each of the methods described in these references, the embossed hologram is read along a straight line in longitudinal direction of a rectangular shape card where the embossed hologram or a diffraction grating is formed. As a result, the device used is relatively simple in structure and it is easy to use, however, is less resistant to forgery.

In addition to the above references, Japanese Patent Laid-Open Publication No. H11-272836 discloses an identification technique using a diffraction grating, Japanese Patent Laid-Open Publication No. 2002-279480 discloses an identification technique using embossed hologram and moire, and Japanese Patent Laid-Open Publication No. 2002-341733 discloses an identification technique using embossed hologram and latent image.

As described above, the technique to determine the authenticity of the card itself is not yet firmly established, and a card, which cannot be forged, is not realized. Also, the technique to eliminate the use of a forged card is not yet realized.

[Patent Document 1] Japanese Patent Laid-Open Publication No. H10-44650
[Patent Document 2] Japanese Patent Laid-Open Publication No. 2003-29636
[Patent Document 3] Japanese Patent Laid-Open Publication No. H06-124866
[Patent Document 4] Japanese Patent Laid-Open Publication No. H06-318282
[Patent Document 5] Japanese Patent Laid-Open Publication No. H07-220077
[Patent Document 6] Japanese Patent Laid-Open Publication No. H09-319849
[Patent Document 7] Japanese Patent Laid-Open Publication No. H11-180079
[Patent Document 8] Japanese Patent Laid-Open Publication No. H11-272836
[Patent Document 9] Japanese Patent Laid-Open Publication No. H10-143621
[Patent Document 10] Japanese Patent Laid-Open Publication No. 2000-47557
[Patent Document 11] Japanese Patent Laid-Open Publication No. 2000-48146
[Patent Document 12] Japanese Patent Laid-Open Publication No. 2000-66567
[Patent Document 13] Japanese Patent Laid-Open Publication No. 2000-298880
[Patent Document 14] Japanese Patent Laid-Open Publication No. 2002-74283
[Patent Document 15] Japanese Patent Laid-Open Publication No. 2002-279480
[Patent Document 16] Japanese Patent Laid-Open Publication No. 2002-341733
[Patent Document 17] Japanese Patent Laid-Open Publication No. 2005-205897
[Non-Patent Document 1] "Financial Business and Artifact-Metrics" published by the Institute for Monetary and Economic Studies, the Bank of Japan (http://www.imes.bo-j.or.jp/japanese/jdps/2004/04-J-12.pdf)
[Non-Patent Document 2] "The Patterns of Artifact-Metrics in Financial Field"; 6th Information Security Symposium (http://www.imes.boj.orjp/japanese/kinyu/2004/kk23-2-6.pdf)
[Non-Patent Document 3] "Handbook on the Technique to Prevent Forgery on the Surface of Affiliated IC Cards", published by the National Printing Bureau, the Ministry of Finance (http://www.npb.go.jp/ja/info/ichb.pdf)
[Non-Patent Document 4] Nikkei Electronics; No. 883

DISCLOSURE OF THE INVENTION

Object of the Invention

It is an object of the present invention to provide a structure of a card for increasing security without adding basic changes to a cash card or a credit card as practically used, and to provide a method for processing the card and a card processing device.

Means

To attain the above object, an authentication verifying chip formed with an embossed hologram or with a diffraction grating is non-separably fixed on the card.

A card authentication verifying device is provided in an apparatus for processing the card. For detecting information of the verifying chip, in addition to making the card in a fixed condition, scanning it by utilizing the movement of the verifying chip when the card is taken into the apparatus is carried out.

EFFECTS OF THE INVENTION

Because the embossed hologram or the diffraction grating utilizing the optical interference has a three-dimensional structure, it is impossible to duplicate it unless produce a replica directly from the prototype. For this reason, even when the magnetic recording data or the data in the IC chip may be copied as practiced in the past, it is practically impossible to use a forged card.

Further, when it is attempted to illegally use the card, such the use can be rejected and damage or loss can be prevented before it actually occurs. Or, an illegitimate card may be allowed for the use to some extent, but it is easily possible to specify the user of the illegitimate card by finally ensuring to hold the illegitimate card.

The use of illegitimate card can be prevented before it is actually used or the use of the illegitimate card can be easily detected and accordingly, illegal use of the card can be prevented.

BRIEF DESCRIPTION OF THE DRAWINGS

FIG. 2 shows a cash card and a credit card of conventional type;

FIG. 5 shows a card using an embossed hologram according to the present invention;

FIG. 6 shows an example of writing authentication verifying data using an embossed hologram;

FIG. 8 shows an example of authentication verifying data of the present invention as prepared by a computer;

FIG. 9 is an example of random numbers to be used in the verifying chip according to the present invention;

FIG. 10 shows an arrangement example of random numbers to be used in the verifying chip according to the present invention;

FIG. 11 shows an example where the random numbers used in the verifying chip are arranged in binary numbers according to the present invention;

FIG. 12 shows an arrangement example where the random numbers used in the verifying chip are in binary numbers according to the present invention;

FIG. 13 shows an example of the additional random numbers used in the verifying chip according to the present invention;

FIG. 14 shows an example where additional random numbers used in the verifying chip are arranged in binary numbers according to the present invention;

FIG. 15 shows an example where additional random numbers used in the verifying chip are arranged in quaternary numbers according to the present invention;

FIG. 16 shows an arrangement example where the random numbers used in the verifying chip are in quaternary numbers according to the present invention;

FIG. 17 shows an example where a plurality of verifying chips are obtained from one random numbers group;

FIG. 21 shows arrangements of a device detecting the mono-color in array;

FIG. 23 shows an arrangement of a device detecting the multi-color in array;

FIG. 24 shows a verifying chip reading device designed with a paraboloid mirror and a polygonal mirror combined;

FIG. 28 shows examples of a different reading route;

FIG. 29 shows a reading route of a verifying chip using binary random numbers;

FIG. 30 shows an example of the feature extraction on a verifying chip using binary random numbers;

FIG. 31 shows an example of the feature extraction on a verifying chip using quaternary random numbers;

FIG. 32 shows an example of analog processing of the verifying chip using binary random numbers;

Figure 1:
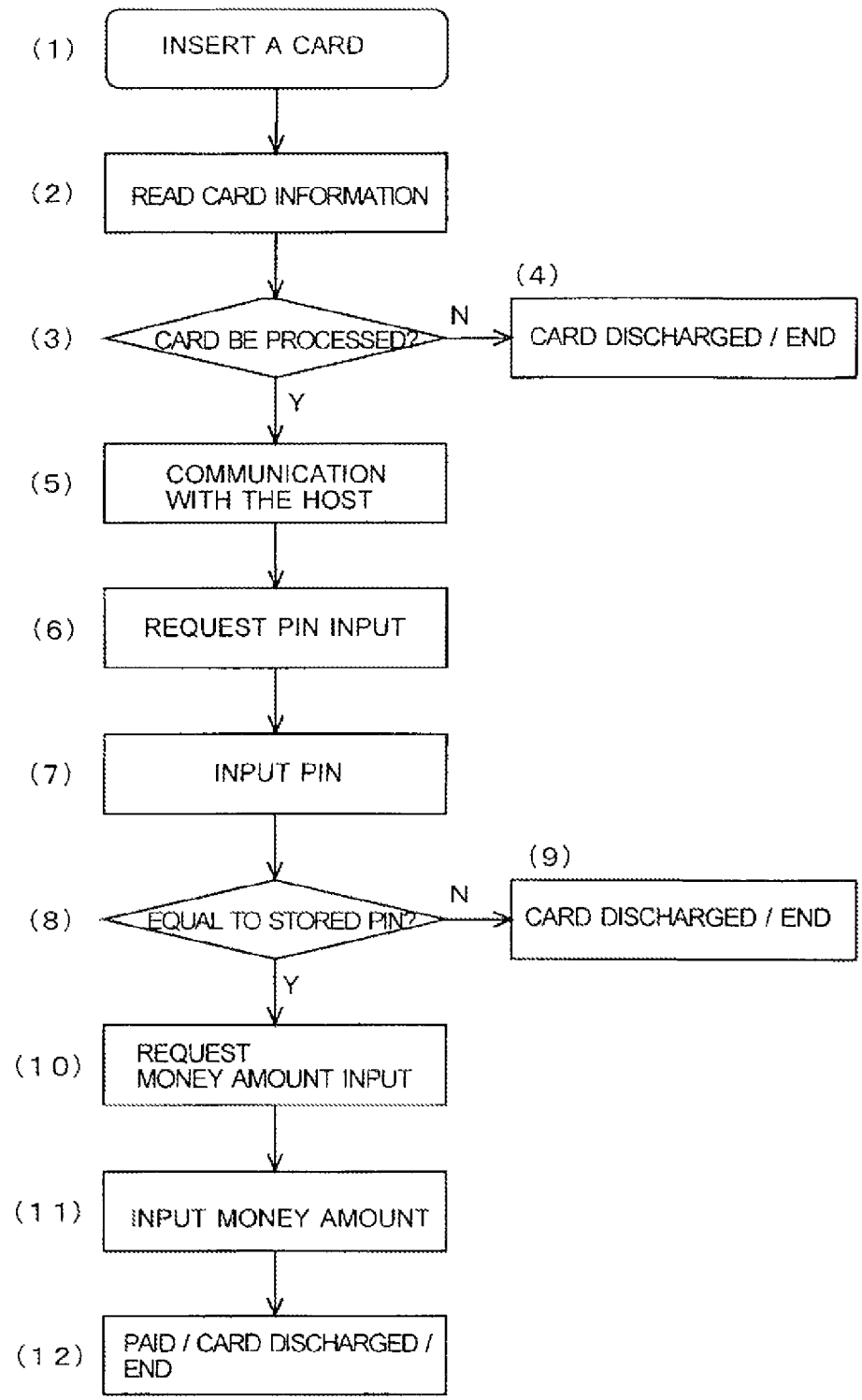
FIG. 1 is a flow chart to show a flow of the processing of a currently used cash card.
Figure 3:
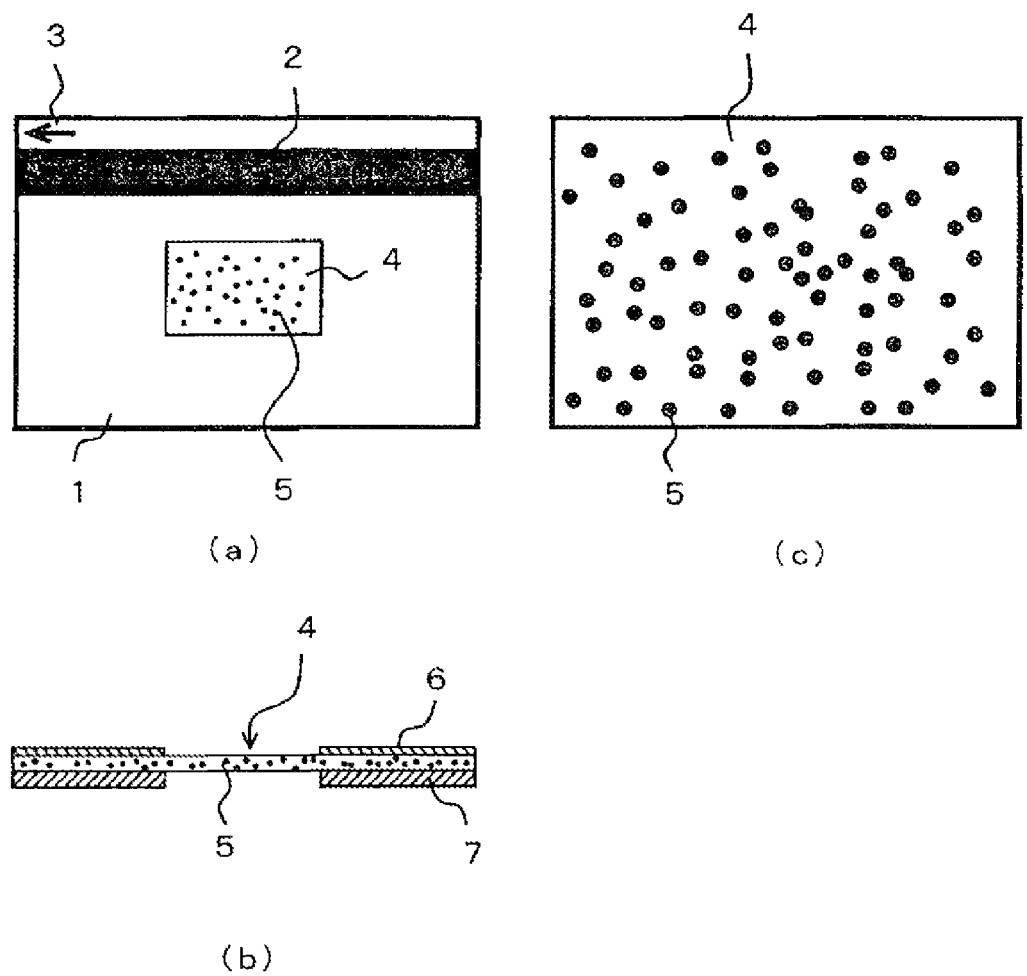
FIG. 3 shows an example of a conventional type card using artifact-metrics by using metal granules.
Figure 4:
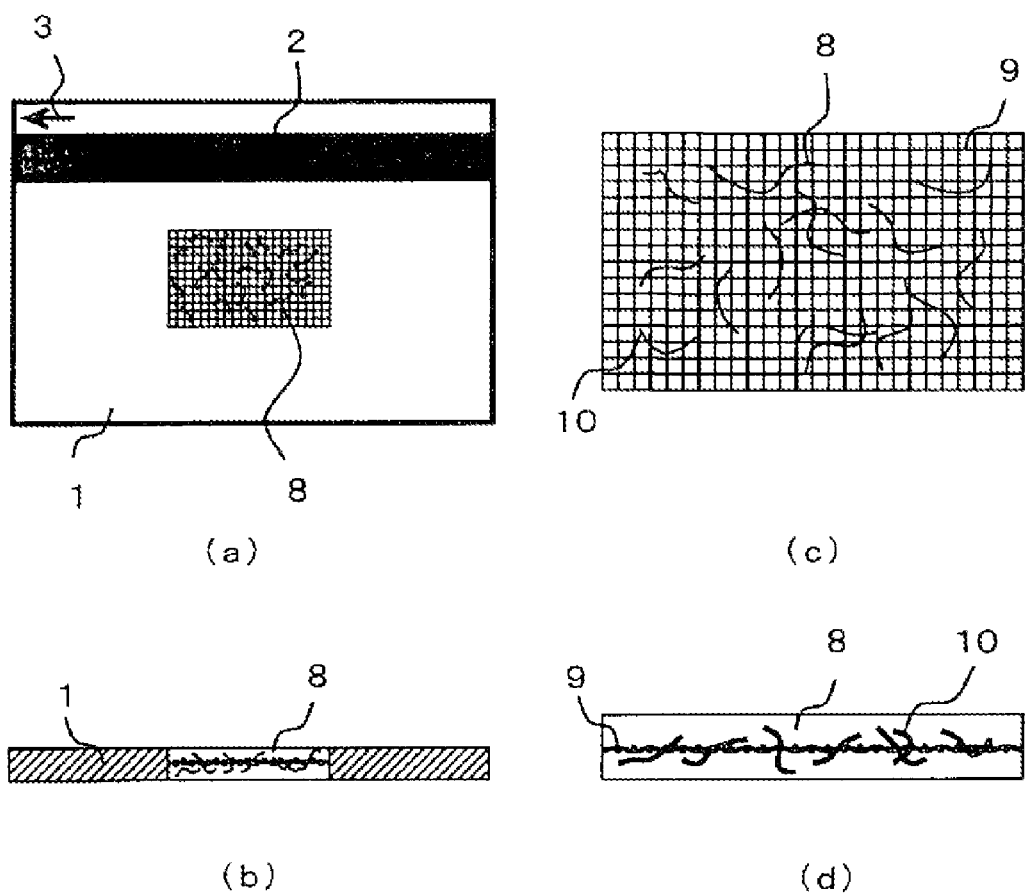
FIG. 4 shows an example of a conventional type card using artifact-metrics by using fibers.

BRIEF DESCRIPTION OF THE REFERENCE NUMERALS 1 card
2 a magnetic stripe
3 an arrow
4, 8, 12, 15, 18, 21, 22, 32, 42, 46, 61 an authentication verifying chip
5 granules
6, 14, 34, 44 a surface plate
7, 35 a card base member
9 a mesh member
10 fabrics pieces
16, 19, 22, 23, 25, 101, 104, 106, 107, 108 a pit
17, 20, 24, 103 a portion where the pit is not formed
48 a position alignment mark
49 a line to start the reading
50 a line to finish the reading
51, 52 a line to indicate the end portion
110 an image pickup device
111 a reading elements matrix
112, 131, 133 a reading element
113, 114 a container contains a reading elements array
115R an array of red color reading elements
115G an array of green color reading elements
115B an array of blue color reading elements
120 a reflecting mirror having a paraboloid in a semi-cylindrical shape
121 a light transmission hole
122 a polygonal mirror
125, 127 a reflecting mirror having a semi-paraboloid in a semi-cylindrical shape
130, 132 a container
134 plural lines route
135, 136 a straight line route

BEST MODE FOR CARRYING OUT THE INVENTION

Detailed description will be given below on the best aspect for carrying out the invention by referring to the accompanied drawings.

FIG. 5 shows a basic arrangement of a card, on which an embossed hologram chip is mounted. FIG. 5(a) shows a general view, FIG. 5(b) is a cross-sectional view, and each of FIGS. 5(c) to (e) shows an enlarged view of the embossed hologram chip.

A card 11 comprises a surface plate 14 with an opening being mounted on a card base member 13 having non-transparent property, and an embossed hologram chip 12 being placed into the opening. On the surface plate 14, a magnetic stripe 2 and an arrow mark 3 are disposed.

The embossed hologram chip is composed of a pit portion with depth equal to ¼ wavelength of a laser beam used and a portion where the pit is not formed. On the pit portion, a reflected laser beam is eliminated by an incident laser beam, and the reflected laser beam is not detected. On the portion without the pit, the reflected laser beam is detected as not eliminated by the incident laser beam.

The laser beam used is an infrared laser beam with $\lambda$ (lambda)=780 nm ($\lambda/4$=195 nm) in case of a CD. In case of a DVD, red laser with $\lambda$=650 nm ($\lambda/4$=151.25 nm) is used. In case of the next generation DVD, using blue-violet laser with $\lambda$=405 nm, ultraviolet laser with $\lambda$=351 nm or far ultraviolet laser with $\lambda$=266 nm is under study. $\lambda/4$ is 101.25 nm, 87.75 nm or 66.5 nm respectively.

FIG. 5(c) shows the most basic structure. Pit portions 16 with the depth of ¼ wavelength of the laser beam used and portions 17 without a pit are arranged with an adequate distance between them one another on an embossed hologram chip 15. In the example shown in this figure, each solid line shown by bidirectional arrows indicates that both incident light and reflected light are present. Each broken line shown by a uni-directional arrow indicates that there is incident light but no reflected light is present.

FIG. 5(d) shows an example where the direction of the laser beam is inclined. Unless information on the tilt angle is available, it is difficult to read the data written therein. In this example, an inclined pit portion 19 with the depth of ¼ wavelength of the laser beam used and an inclined portion 20 without a pit are arranged with an adequate distance between them one another on an embossed hologram chip 18.

In the example shown in this figure also, each solid line shown by bidirectional arrows indicates that both incident light and reflected light are present, and each broken line shown by a uni-directional arrow indicates that there is incident light but reflected light is not present. It is almost impossible to duplicate the embossed hologram chip of this structure. It is possible that the structure shown in FIG. 5(c) and the structure shown in FIG. 5(d) coexist.

FIG. 5(e) shows an example where laser beams with a plurality of wavelengths are used. Unless information on all of the laser beams used is available, it is difficult to read the written data. In this example, a pit portion 22 with the depth of ¼ wavelength of the red (R) laser beam; a pit portion 23 with the depth of ¼ wavelength of the green (G) laser beam; a pit portion 25 with the depth of ¼ wavelength of the blue (B) laser beam; and a portion 24 without a pit are arranged with an adequate distance between them one another on an embossed hologram chip 21.

In the example shown in this figure also, each solid line shown by bidirectional arrows indicates that both incident light and reflected light are present. Each broken line shown by a uni-directional arrow indicates that there is incident light but no reflected light is present. It is almost impossible further to duplicate the embossed hologram chip of this structure. It is also possible that the structure shown in FIG. 5(d) and the structure shown in FIG. 5(e) coexist.

[Embodiment 1 of the Authentication Verifying Chip]

Referring to FIG. 6, descriptions below are on authentication verifying data written on pits. The pits where data is to be displayed are arranged regularly to ensure the reading. In FIG. 6, one dot chain line indicates the stationing of pits. FIG. 6(a) and FIG. 6(b) show examples where a laser beam with a single wavelength is used and where the same data is recorded. FIG. 6(c) shows an example where laser beams with multiple wavelengths (three wavelengths in this case) are used.

In FIGS. 6(a), (b) and (c), the pits where data is recorded are arranged at regular intervals. FIG. 6(a) corresponds to FIG. 5(c). A pit 101 is formed at a position where data of "101010110" of an embossed hologram chip base member 15 is recorded, and a protective layer 100 is disposed on it.

[Embodiment 2 of the Authentication Verifying Chip]

FIG. 6(b) corresponds to FIG. 5(d). In order to record data of "101010110" of an embossed hologram chip base member 18, a pit 104 having an inclined surface at a position of the data 1 is formed and an inclined surface 103 is formed at a position of the data 0, and a protective layer 102 is formed on it. In order that the data can be detected from a direction different from the inclined surface 103 and the pit 104, an inclined surface and a pit with a different inclination angle from those inclination angles may be formed.

[Embodiment 3 of the Authentication Verifying Chip]

FIG. 6(c) corresponds to FIG. 5(e). A pit 108 for information "00101010" by an infrared laser beam of 780 nm, a pit 107 for information "01000100" by a red laser beam of 650 nm and a pit 106 for an information of "10010001" by a blue laser beam of 405 nm are formed on an embossed hologram base member 21, and a protective layer 105 is disposed on it.

[Embodiment 4 of the Authentication Verifying Chip]

Figure 8:
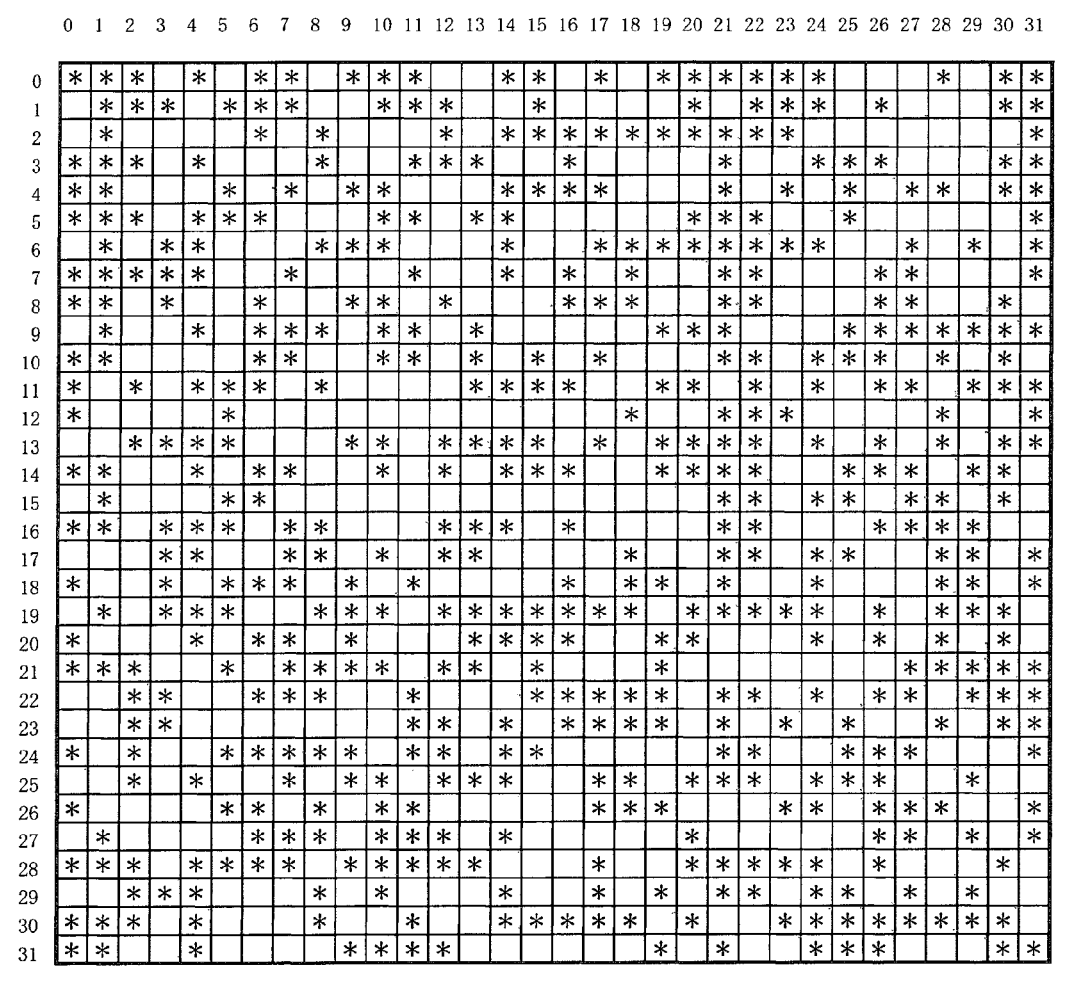

In a verifying chip, which is to be read by a machine, there is no need that a pattern such as characters, design, etc. recognizable by a person is written. FIG. 8 shows a pit arrangement example of the verifying chip, prepared by using binary data by a compute, suitable for mechanical reading.

In this verifying embossed hologram chip, 1024 binary data are arranged in a matrix form of 32×32, consisting of an embossed hologram. In this figure, the position where binary data "0" is written is shown in blank, and the position where the binary data "1" is written is shown with a mark "*".

Now, a method to obtain the binary data is described. FIG. 9 shows an example of true random numbers with hexadecimal numbers of 256 digits, which are obtained by detecting a radiation ray irradiated as the result of nuclear fission of radioactive substance. Random numbers used for a crypt key or the like are generally supplied as hexadecimal numbers as such.

FIG. 10 shows hexadecimal random numbers shown in FIG. 9 arranged in the matrix form of 8 columns×32 rows. The hexadecimal numbers can be expressed by replacing with binary 4-digit numbers.

That is, "0" of the hexadecimal number corresponds to "0000" of binary numbers. Similarly, "1" corresponds to "0001", "2" corresponds to "0010", "3" corresponds to "0011", "4" corresponds to "0100", "5" corresponds to "0101", "6" corresponds to "0110", "7" corresponds to "0111", "8" corresponds to "1000" and "9" corresponds to "1001". "A" corresponds to "1010", "B" corresponds to "1011", "C" corresponds to "1100", "D" corresponds to "1101", "E" corresponds to "1110" and "F" corresponds to "1111".

Based on the expressions as given above, 256-digit hexadecimal random numbers shown in FIG. 9 are substituted by binary random numbers as shown in FIG. 11. One digit of the hexadecimal number can be replaced by 4-digit binary numbers. Thus, 256-digit hexadecimal numbers correspond to 256 digits×4 digits=1024 digits in binary numbers. These binary numbers can be obtained directly in a random number generator, and in such a case, it is not necessary to perform substitution operation.

These numbers are arranged in the matrix of 8 columns×32 rows as shown in FIG. 10. Further, for each digit of binary numbers, matrix of 32 columns×32 rows are arranged as shown in FIG. 12.

Figure 12:
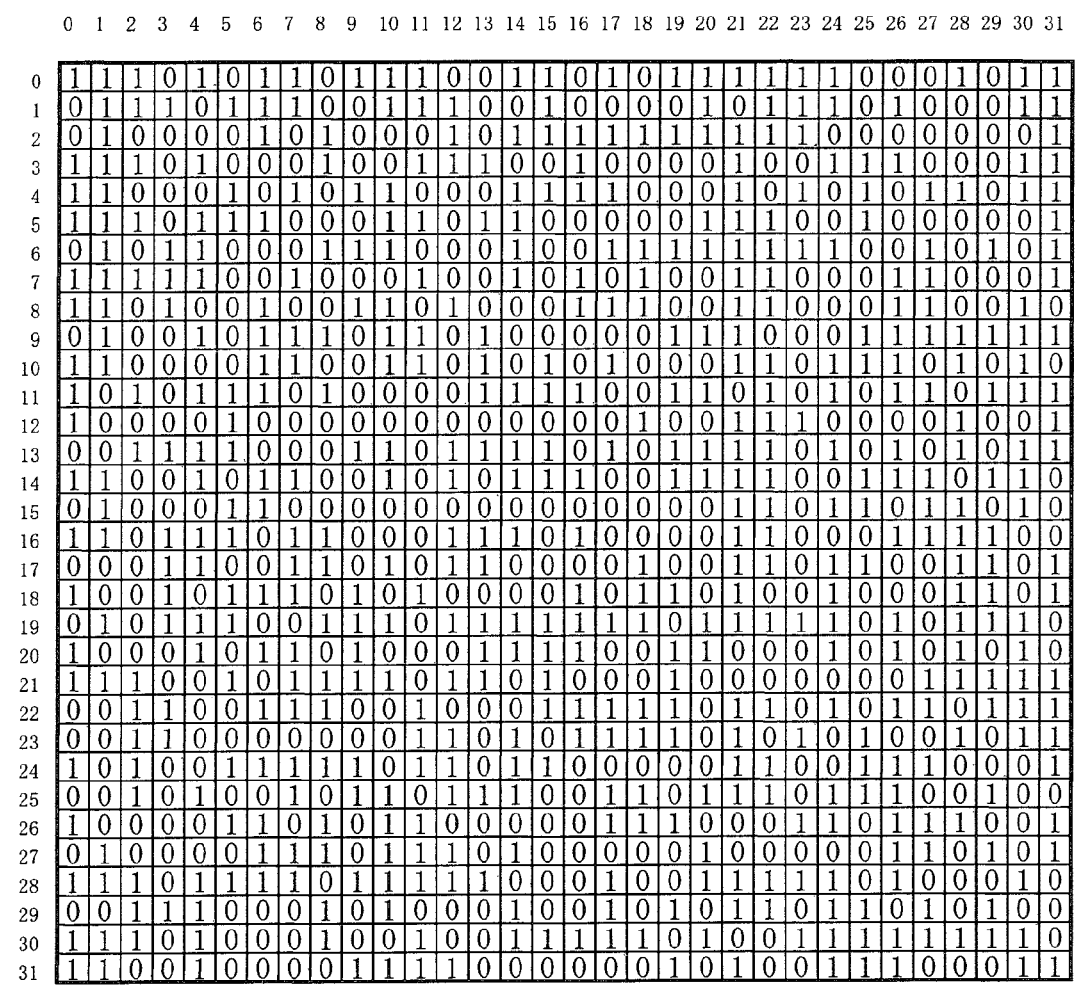

Finally, the position corresponding to "0" of the binary number in the matrix of FIG. 12 is left without writing the data. Data is written to the position with the mark "*" to correspond to "1". The arrangement of the verifying chip as shown in FIG. 8 is thus, obtained.

The authentication verifying chip prepared in this way has 32 column×32 rows×1 bit=1024 bits for authentication verifying, that is, it has an authentication verifying key of 1024 bits.

For the embossed hologram chip shown in FIG. 6(c), the lights with a plurality of wavelengths can be used. Next, an example of the pit arrangement of a verifying chip of a card, which is prepared by computer suitable for mechanical reading of binary data, and which uses the lights of generally called red (R), green (G) and blue (B) is described.

These "R", "G" and "B" can express a total of four conditions including "0" where no data is written. In other words, these can be handled as quaternary numbers. The quaternary numbers can be expressed by four 2-bit numbers, i.e., "00", "01", "10", and "11".

FIG. 13 shows hexadecimal random numbers of 256 digits shown in FIG. 9 and further hexadecimal random numbers of 256 digits which antecede those. Here, what is shown as "hexadecimal random numbers group a" is the same random numbers as shown in FIG. 9, and "hexadecimal random numbers group b" is the random numbers, which antecedes "hexadecimal random numbers group a".

These hexadecimal random numbers group is converted to a binary random numbers group. FIG. 14 shows the random numbers divided for every 2 bits in order to convert to the quaternary numbers expressed as "0", "R", "G" and "B".

Figure 15:
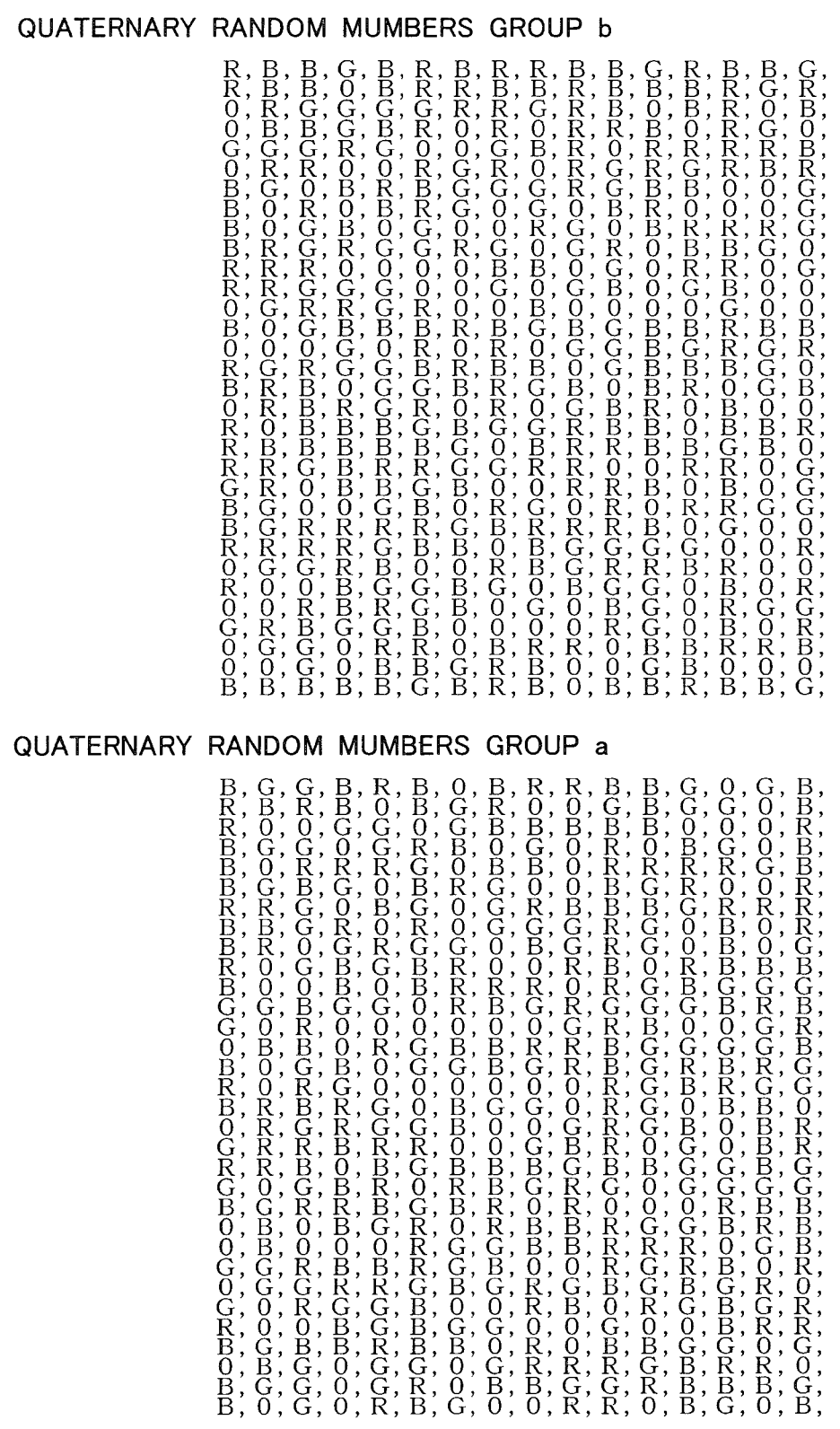

Further, binary number "00" is converted to quaternary number "0", binary number "01" to quaternary number "R", binary number "10" to quaternary number "G" and binary number "11" to quaternary number "B" as shown in FIG. 15.

The quaternary numbers thus obtained are arranged in the matrix of 32 columns×32 rows, similarly to the binary numbers shown in FIG. 8 or FIG. 12, and these are shown in FIG. 16. The verifying chip thus prepared has the data of 32 columns×32 rows×2 bits=2048 bits for authentication verifying, in other words, it has an authentication verifying key of 2048 bits.

[Embodiment 5 of the Authentication Verifying Chip]

Figure 17:
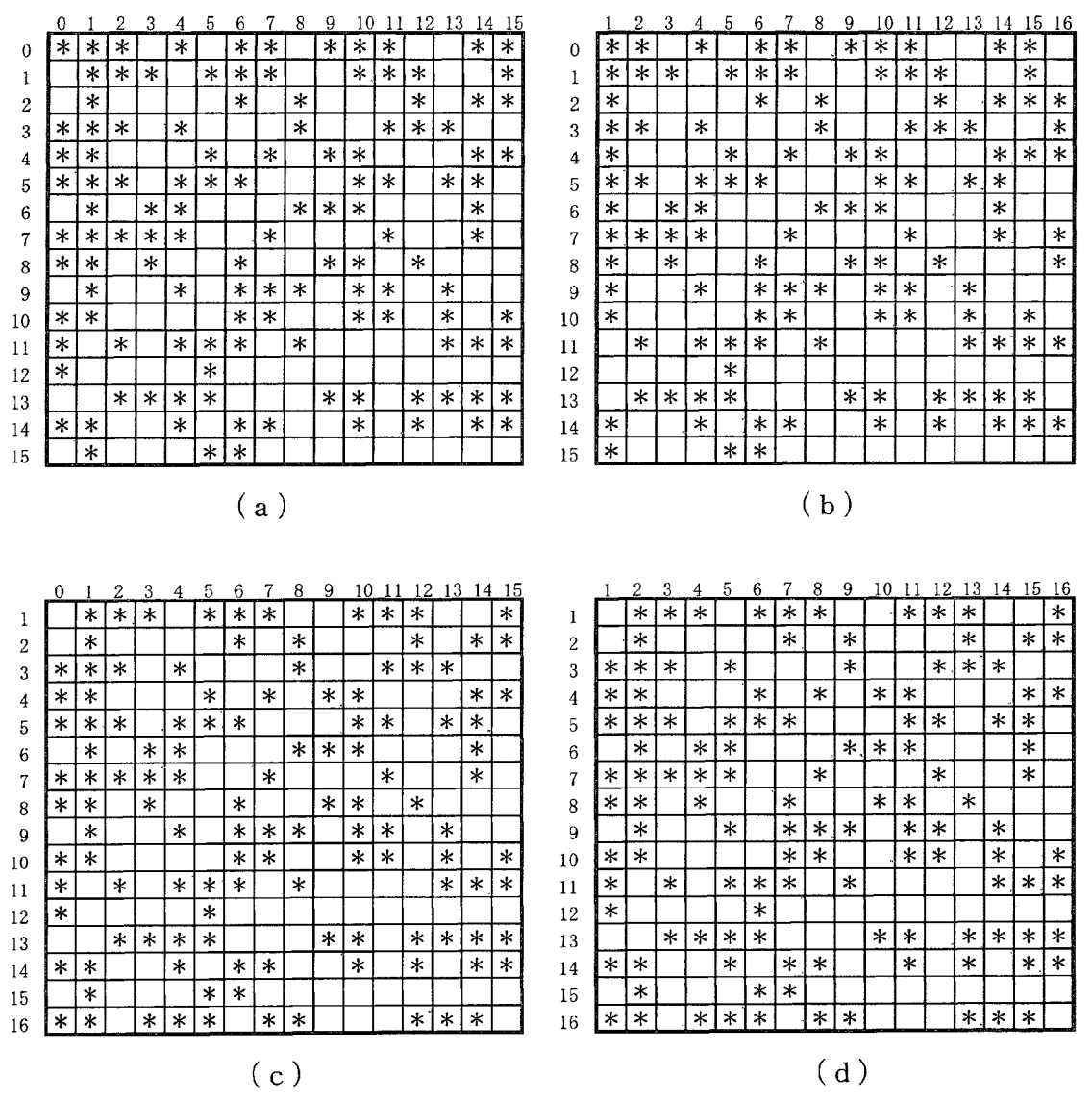

Now, referring to FIG. 17, a method to obtain a plurality of verifying chips from one random numbers group is described. FIG. 17(a), FIG. 17(b), FIG. 17(c) and FIG. 17(d) each shows a matrix pattern of 16×16 based on the matrix pattern of 32×32 in FIG. 8. FIG. 17(a) has the origin at the coordinates (0,0), FIG. 17(b) has the origin at the coordinates (1,0), FIG. 17(c) has the origin at the coordinates (0,1) and FIG. 17(d) has the origin at the coordinates (1,1). In this way, it is possible to have a plurality of matrix patterns from one matrix pattern obtained from the random numbers group shown in FIG. 6.

Figure 7:
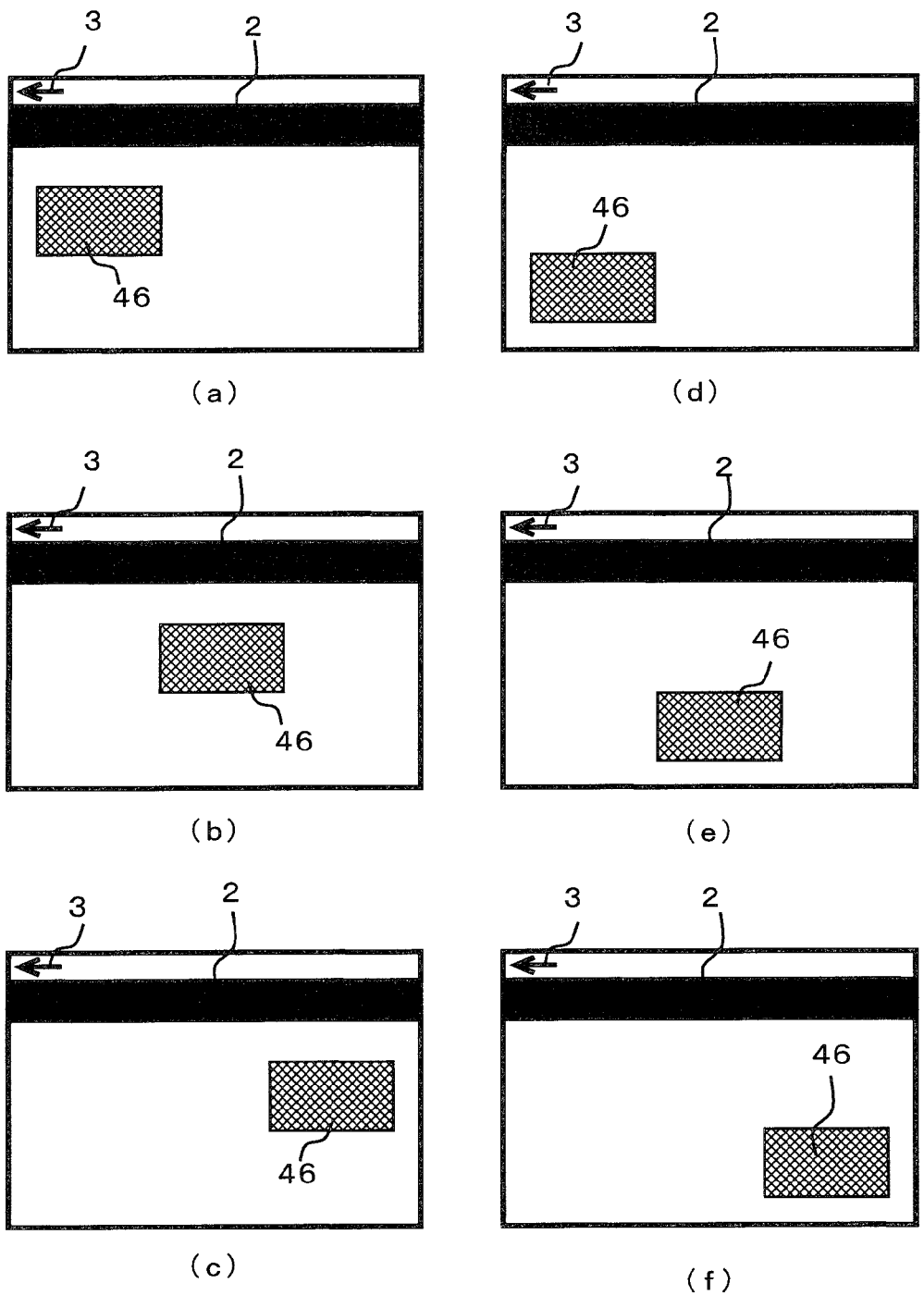
FIG. 7 shows examples of the mounting position of the authentication verifying chip.

For the purpose of obtaining a plurality of matrix patterns from one random numbers group, it is also possible to use various methods such as a method to change the use position to start the random numbers group shown in FIG. 6 or a method to change the preparation position to start the matrix pattern shown in FIG. 7.

In so doing, a card issuer can maintain secrecy by arranging one random numbers group as a master random numbers group and can obtain a plurality of matrix patterns based on the master random numbers group. It is also possible to automatically control the plurality of matrix patterns based on the information of the origin.

In the examples shown in FIG. 8, FIG. 12 and FIG. 17, the authentication verifying data is recorded by binary numbers expressed in 1 bit, and in the example shown in FIG. 16, the authentication verifying data is recorded by quaternary numbers expressed in 2 bits. In addition to these, it is also possible to use octal numbers expressed in 3 bits and hexadecimal numbers expressed in 4 bits.

[Mounting Position of the Authentication Verifying Chip]

FIG. 7 shows examples of the mounting positions of the verifying chip according to the structural features as described above. The verifying chip 46 can be mounted, other than the position at about the central portion of the card body as shown in FIG. 5, at the following positions: at the foremost position in the middle portion as shown in FIG. 7(a); at the central position in the middle portion as shown in FIG. 7(b); at the posterior position in the middle portion as shown in FIG. 7(c); at the foremost position in the lower portion as shown in FIG. 7(d); at the central position in the lower portion as shown in FIG. 7(e); and at the posterior position in the lower portion as shown in FIG. 7(f). While it can also be mounted at a position in the upper portion, it is desirable for the mounting position to avoid the position in the upper portion, when there may be influence on the reading of the information from the magnetic stripe.

[Embodiment 1 of the Reading Device]

Descriptions below are on the reading of a verifying chip, which is an embossed hologram chip. A method to read the embossed hologram chip simply as a plane, a method to read a plane as an assembly of lines and a method to read a plane as an assembly of dots are known.

Figure 18:
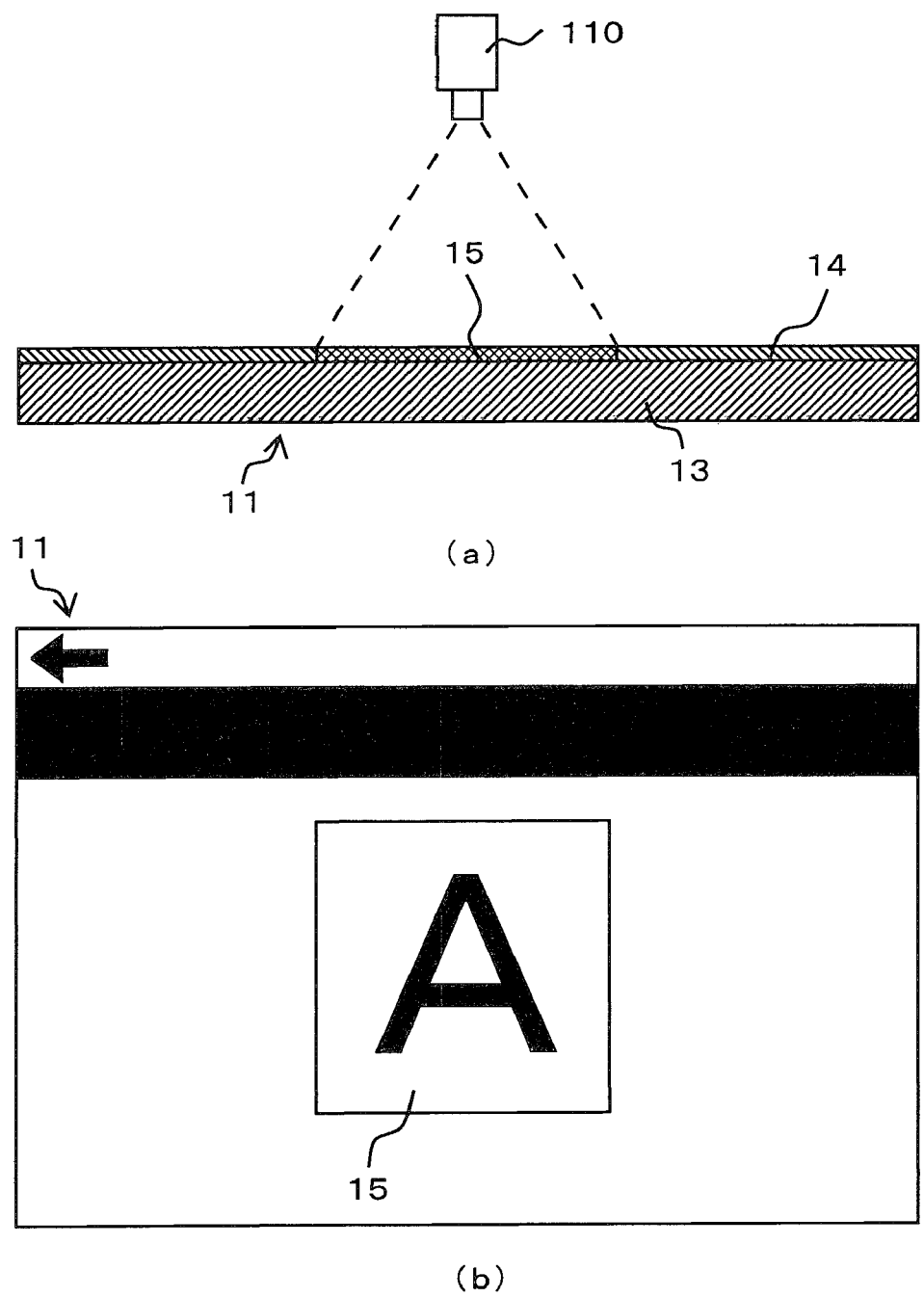
FIG. 18 shows a verifying chip reading device using an image pickup device.

FIG. 18 shows an example using an image pickup device of the most basic arrangement in the method to read the embossed hologram chip simply as a plane. From a card body 11, which consists of a card base plate 13, a card surface plate 14 and an embossed hologram chip 15, the embossed hologram chip 15 is read by an image pickup device 110, and the result is verified by the pattern recognition technique.

When the card 11 is taken into a reading apparatus and is stopped, the image pickup device 110 photographs the embossed hologram chip 15, which is irradiated by a laser beam source (not shown). By the image thus photographed, the embossed hologram chip 15 is authenticated, and accordingly, the authenticity of the card 11 is verified.

[Embodiment 2 of the Reading Device]

Figure 19:
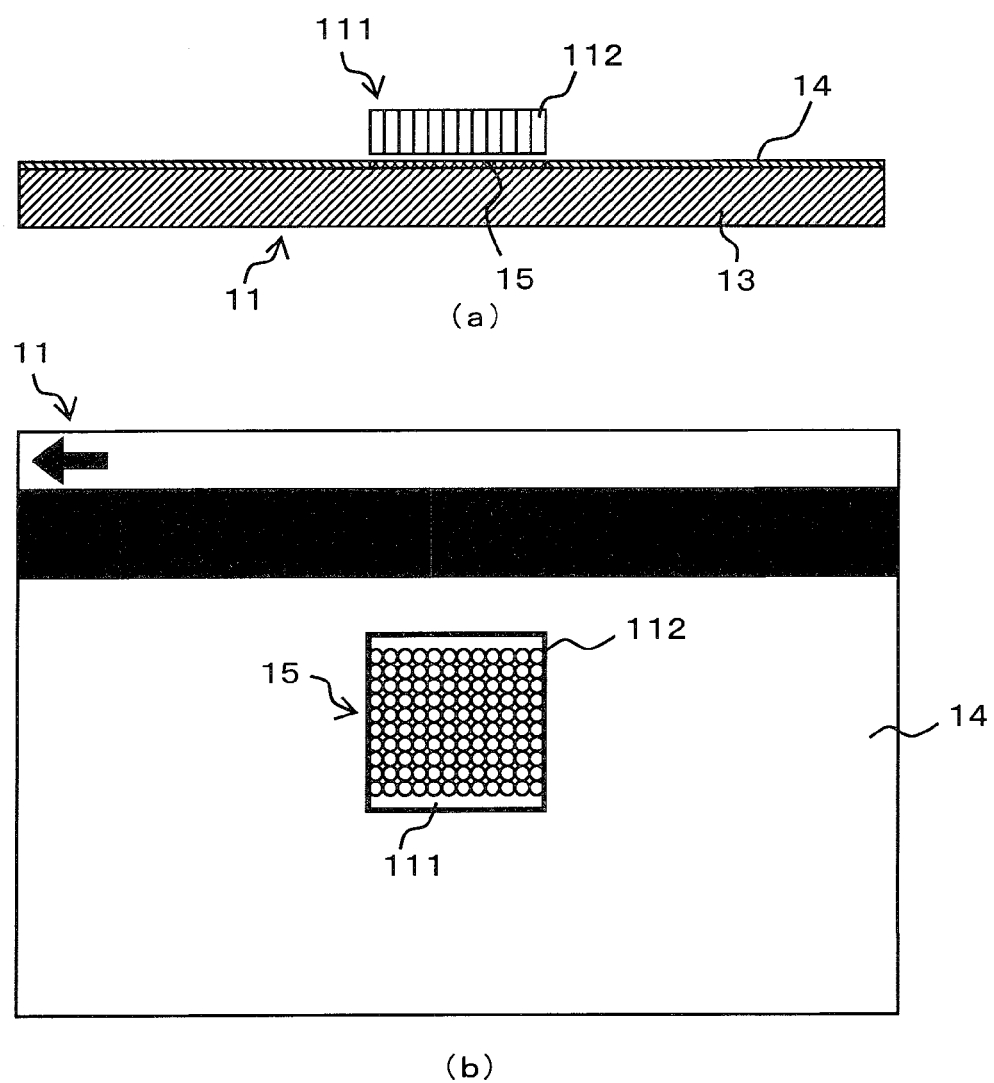
FIG. 19 shows a verifying chip reading device using reading elements in a matrix form.

Referring to FIG. 19, description will be given below on an arrangement example of a reading device, which comprises detection elements in the form of matrix and which performs reading in the planar shape. FIG. 19(a) shows a general arrangement of a reading device and FIG. 19(b) shows the corresponding relation between the card and the reading device. In FIG. 19, the reference numeral 11 shows a card body; 13 a base plate; 14 a surface plate; and 15 a verifying chip, which is an embossed hologram chip. The reference numeral 111 shows a reading elements matrix where small size reading elements 112 are arranged in the planar shape so as to cover up the verifying chip 15. Each of the reading elements has a light source comprising a semiconductor laser or the like and a light detecting element comprising a photodiode or the like.

When the card 11 is taken into a reading apparatus and is stopped, the verifying chip 15 is positioned under the reading elements matrix 111 in planar shape. Then, the reading elements matrix 111 reads authentication verifying data of the verifying chip 15.

[Embodiment 3 of the Reading Device]

Description will be given below on a device for reading the plane of the verifying chip as an assembly of lines.

Figure 20:
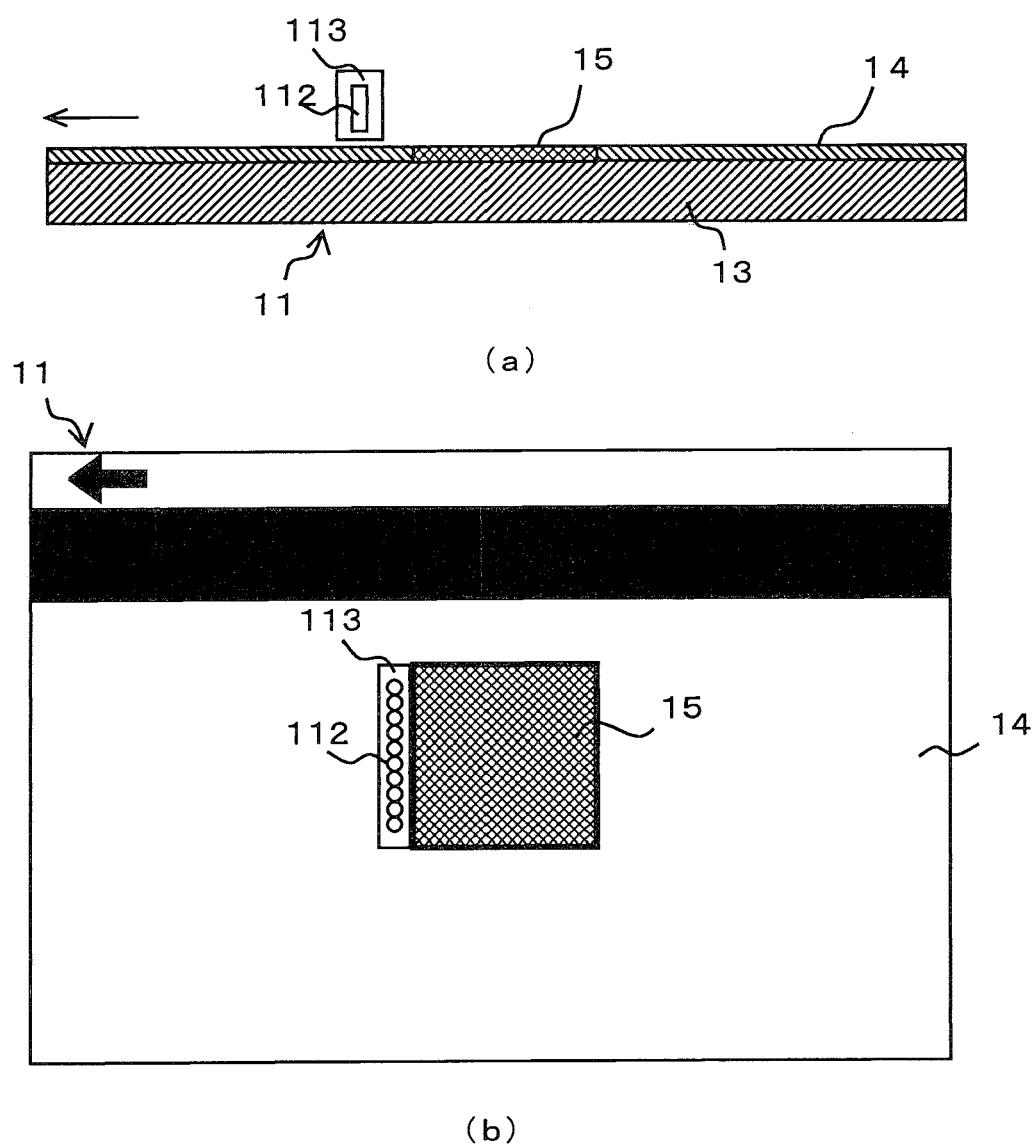
FIG. 20 shows a verifying chip reading device using a mono-color reading device in array.

FIG. 20 shows an example where the reading elements are arranged in array. FIG. 20(a) shows a general arrangement of a detecting unit of a reading device and FIG. 20(b) shows the corresponding relation between the card and the reading elements in array. The card 11 is the same as the card shown in FIG. 19, and the detailed description on the card is not given here.

In FIG. 20, the reference numeral 113 shows a container with a length, which is slightly longer than the width in moving direction of the verifying chip 15. A plurality of reading elements array 112 are placed in a linear arrangement within the container and make up together a reading elements array. Each of the reading elements has a light source comprising a semiconductor laser and the like and a light detecting element comprising a photodiode or the like.

When the card 11 is taken into a card reading apparatus, it passes under the reading elements array. At this moment, the reading elements array 112 reads authentication verifying data of the verifying chip 15.

Figure 32:
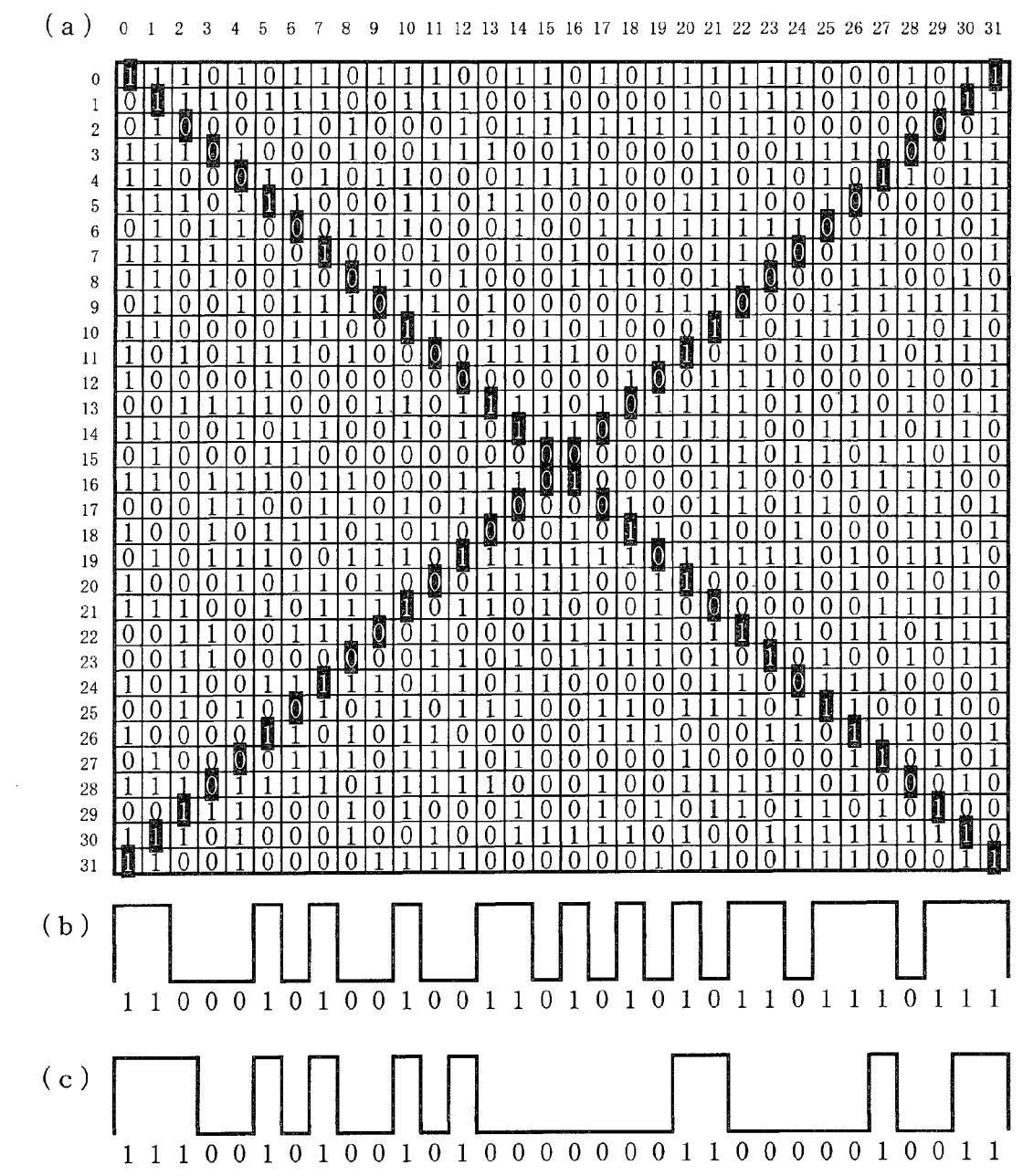

FIG. 21 shows examples of arrays of the reading elements in the reading device as shown in FIG. 20. As shown in FIG. 21(a), 32 reading elements are placed from "D00" to "D31"

in a single column on a base. These may be placed from "D00" to "D31" in a zigzag arrangement as shown in FIG. 21(b).

[Embodiment 4 of the Reading Device]

Figure 22:
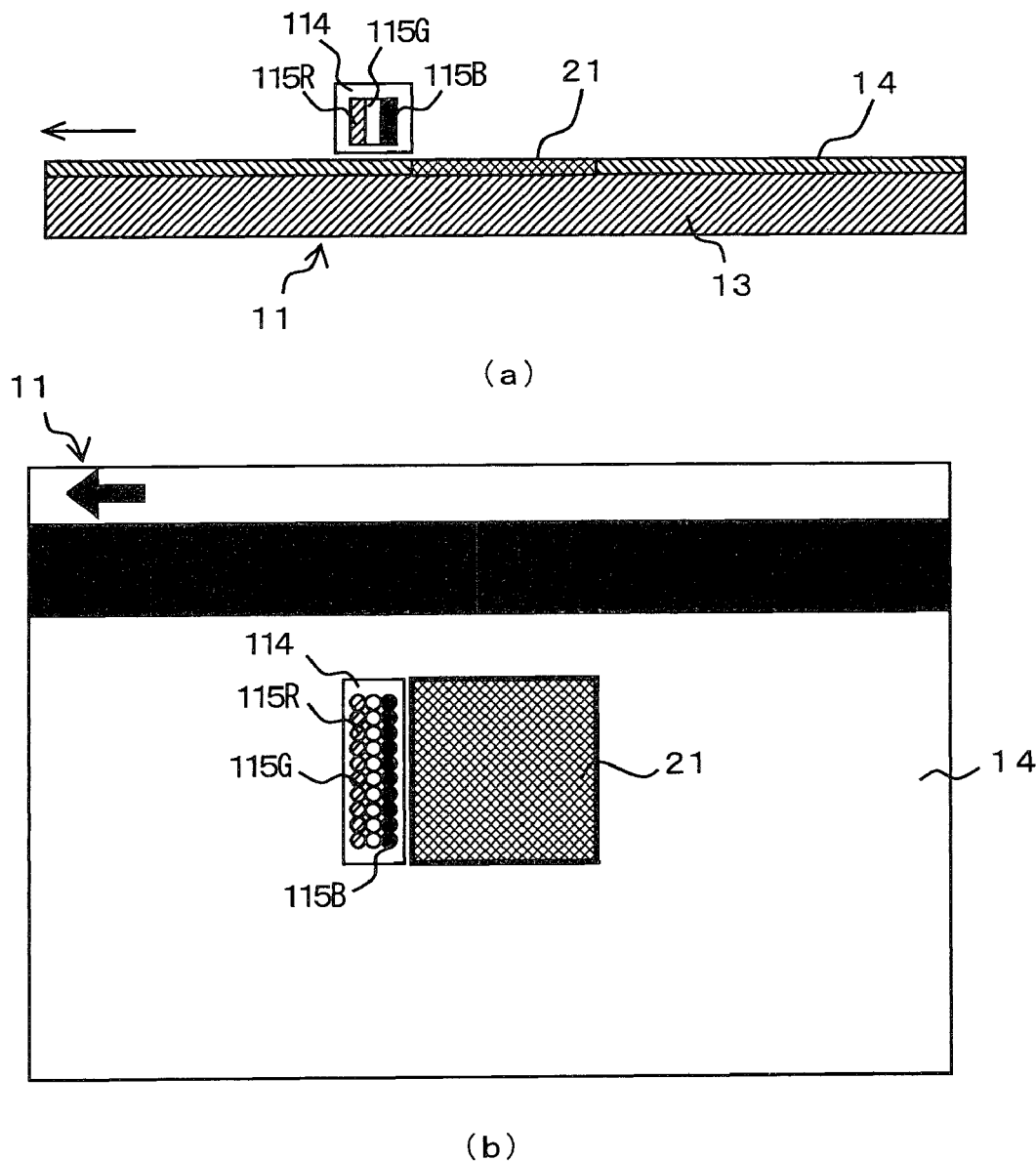
FIG. 22 shows a verifying chip reading device using multi-color reading elements in array.

FIG. 22 shows an arrangement example of a device for the card authentication verifying when a plurality of different colors are used, which are quaternary numbers as shown in FIG. 16. In this example, according to the reading elements array shown in FIG. 20, a container 114 contains an array of red light reading elements 115R, an array of green light reading elements 115G, and an array of blue light reading elements 115B.

The red light reading elements array 115R, the green light reading elements array 115G and the blue light reading elements array 115B are given here simply as examples, and it is needless to say that any combination of color lights may be used.

FIG. 23 shows an arrangement example of arrays of reading elements when a laser beam R, a laser beam G and a laser beam B as shown in FIG. 22 are used. In this example, an array of the laser beam R reading elements "R00" to "R31", an array of the laser beam G reading elements "G00" to "G31", and an array of the laser beam B reading elements "B00" to "B31", having 32 reading elements each are arranged in three columns.

[Embodiment 5 of the Reading Device]

In the efforts to develop the next generation DVD, it has been under study that laser beams of a laser for CD, a laser for DVD and a laser for the next generation DVD can be detected by an optical detector applicable to three wavelengths by using an optical head using the optical system to be integrated or by using a 3-wavelength laser which can emit three laser beams by a single element. (See Nikkei Electronics, No. 883, p.119, Sep. 27, 2004). When the optical detectors are aligned in one row and are used, it is possible to have an arrangement of the reading elements array for the laser beam R, the laser beam G and the laser beam B, similar to the arrangement shown in FIG. 20.

[Embodiment 6 of the Reading Device]

FIG. 24 shows a reading device with the new arrangement. Optical scanning means to use the reflection of the laser beam by a rotating polygonal pillar mirror is adopted in the device such as a laser beam printer. In this scanning means, optical scanning can be performed only by the rotating movement of the polygonal pillar mirror. Because the reflection light beam obtained is reflected in radial direction, the light beam does not enter perpendicularly to an object. In this sense, the optical scanning by the polygonal pillar mirror is not the optimal means to be used as the detecting means for an embossed hologram chip by reading the information according to the depth of pits and to the wavelength of the incident light.

As the means to obtain parallel beams, paraboloid is used in a reflecting telescope or a parabola antenna. FIG. 24(a) shows the relation between a paraboloid and parallel beams. In this figure, reference symbol X represents X-axis and the symbol Y represents Y-axis which is orthogonal to X-axis and the symbol O represents the origin. The symbol P represents a parabola, which is expressed as $Y=-X^2$. This parabola has a focal point F at the position of X=0 and Y=-¼. All straight lines running in parallel to Y-axis are concentrated to the focal point F when reflected by the parabola P. In other words, any straight line starting from the focal point F runs in parallel to Y-axis when reflected by the parabola P.

A basic arrangement of a device for reading an embossed hologram by applying this principle is shown in FIG. 24(b). In this figure, the reference numeral 120 represents a reflecting mirror having a parabolic cylindrical surface. It is designed in semi-cylindrical shape with its length running in a direction perpendicularly crossing the drawing surface. Also, a light transmission hole 121 where light can pass through is formed at a position which corresponds to the origin in FIG. 24(a). Further, at the focal point of the reflecting parabolic cylinder mirror 120, a polygonal mirror 122 is disposed, which has a rotation axis in parallel to extending axis of the reflecting parabolic cylinder mirror 120 and has a polygonal reflecting surface. The reference numeral 124 represents an embossed hologram chip.

A laser beam emitted from a light emitting/detecting element 123 in direction of Y-axis as shown in FIG. 24(a) passes through the light transmission hole 121 and incidents on the polygonal mirror 122. The laser beam, thus incidented on the polygonal mirror, is reflected and incidents on the reflecting parabolic cylinder mirror 120. Then, it is reflected and incidents on the embossed hologram chip 124.

As the polygonal mirror 122 is disposed at the focal point of the reflecting parabolic cylinder mirror 120, the laser beam, which is reflected by the polygonal mirror 122 and incidents on the reflecting parabolic cylinder mirror 120, is reflected again. It is reflected in a direction in parallel to the advancing direction of the laser beam emitted from the light emitting/detecting element 123 and it then, incidents on the embossed hologram chip 124. When the laser beam, which has incidented on the pit of the embossed hologram chip 124, is reflected without being eliminated, the laser beam runs along the same route as the incident laser beam in reverse direction and the reflected laser beam incident on the light emitting/detecting element 123. As it can be understood from the above explanation, all of the laser beams emitted from the light emitting/detecting element 123 incidents on the embossed hologram chip 124 in a direction perpendicular to it.

[Embodiment 7 of the Reading Device]

In the embossed hologram reading device as shown in FIG. 24(b), it is not possible to read the information on the embossed hologram chip 124 on a portion, which is on rear side of the polygonal mirror 122 as seen from the direction of the light emitting/detecting element 123. It can be so designed that necessary information is not written on this portion or that only unnecessary information is written on this portion. However, if an arrangement shown in FIG. 24(c) is adopted, there is no portion, which corresponds to the rear side of the polygonal mirror 122, and all of the information written in the embossed hologram chip 124 can be read out.

FIG. 24(c) shows the most basic arrangement for this purpose, which uses a half of the reflecting parabolic cylinder mirror. In FIG. 24(c), the reference numeral 125 represents a reflecting mirror with a paraboloid surface, and it is designed in semi-cylindrical shape having its length in a direction running perpendicularly crossing the drawing surface only on the portion where the value of X is negative in FIG. 24(a). The light transmission hole 121 as shown in FIG. 24(b) is not formed because it is not needed. Further, at the focal point of the reflecting half-parabolic cylinder mirror 125, a polygonal mirror 122 is disposed, which has a rotation axis in parallel to the axis in extending direction of the reflecting half-parabolic cylinder mirror 125 and has a polygonal reflecting surface. The reference numeral 126 represents an embossed hologram chip.

After being emitted from the light emitting/detecting element 122 in direction of the polygonal mirror 122, the laser beam is reflected by the polygonal mirror 122 and incidents on the reflecting half-parabolic cylinder mirror 125. Then, it is reflected and incidents on the embossed hologram chip 126 in a direction perpendicular to it. In this embossed hologram reading device, it is only an end portion of the embossed hologram chip 124, which is on rear side of the polygonal mirror 122 when seen from the direction of the light emitting/detecting element 123. Accordingly, the portion which cannot be read has little influence.

[Embodiment 8 of the Reading Device]

Further, when the central portion of a reflecting partial paraboloid cylindrical mirror 127 is reduced as shown in FIG. 24(*d*) and it is configured that a portion where the polygonal mirror 122 faces to the reflecting semi-parabolic cylinder mirror 127 is offsetted. There is no more portion, which cannot be read, and it is possible to read the information written in all parts of the embossed hologram chip 128.

[Embodiment 9 of the Reading Device]

When a plurality of reading devices as shown in FIGS. 24(*b*), (*c*) and (*d*) are provided corresponding to a plurality of wavelengths, it is possible to read a plurality of wavelengths.

[Embodiment 10 of the Reading Device]

Figure 25:
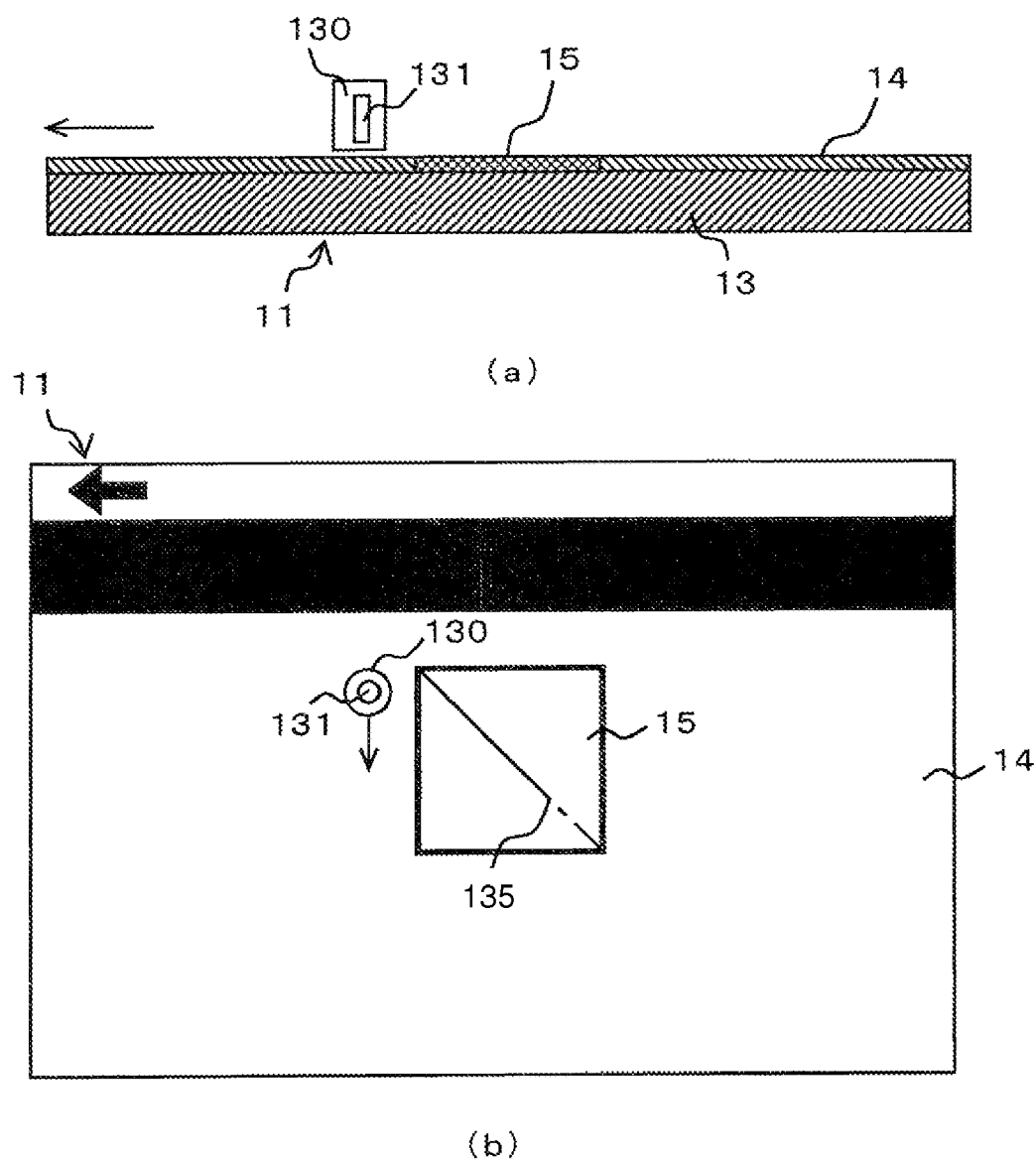
FIG. 25 shows a verifying chip reading device using a single reading element according to the present invention.

Description will be given as below on a reading device, which reads the plane of the authentication verifying chip as an assembly of dots. FIG. 25 shows a reading device using a single reading element. FIG. 25(*a*) shows a general arrangement of the relation between the card and the reading device and FIG. 25(*b*) is a drawing to explain a data detecting method. The reference numeral 11 represents a card body; 13 a card base plate; 14 an upper surface plate of the card; 15 a verifying chip; 131 a reading element; and 130 a container to accommodate the reading element 131. The reading element 131 moves in a direction which perpendicularly crosses the direction that the card is taken into the reading apparatus.

For the movement which perpendicularly crosses the direction that the card is taken into the device, either of appropriate methods such as a pseudo-linear movement based on the rotation on one point as a fulcrum, a linear movement based on the conversion from rotary movement to linear movement and a linear movement based on a linear motor can be adopted. FIG. 25(*b*) shows a typical example of a movement route. In this example, the reading element moves at the uniform speed in a direction indicated as shown by an arrow mark in FIG. 25(*b*) and moves along a linear route 135 which is resulted from the movement synthesized with the moving direction of the card itself. The reading element does not necessarily move, and it can be used by moving to an arbitrary position in a direction which perpendicularly crosses the direction of the card 11 being taken, and by fixing it there.

[Embodiment 11 of the Reading Device]

Figure 26:
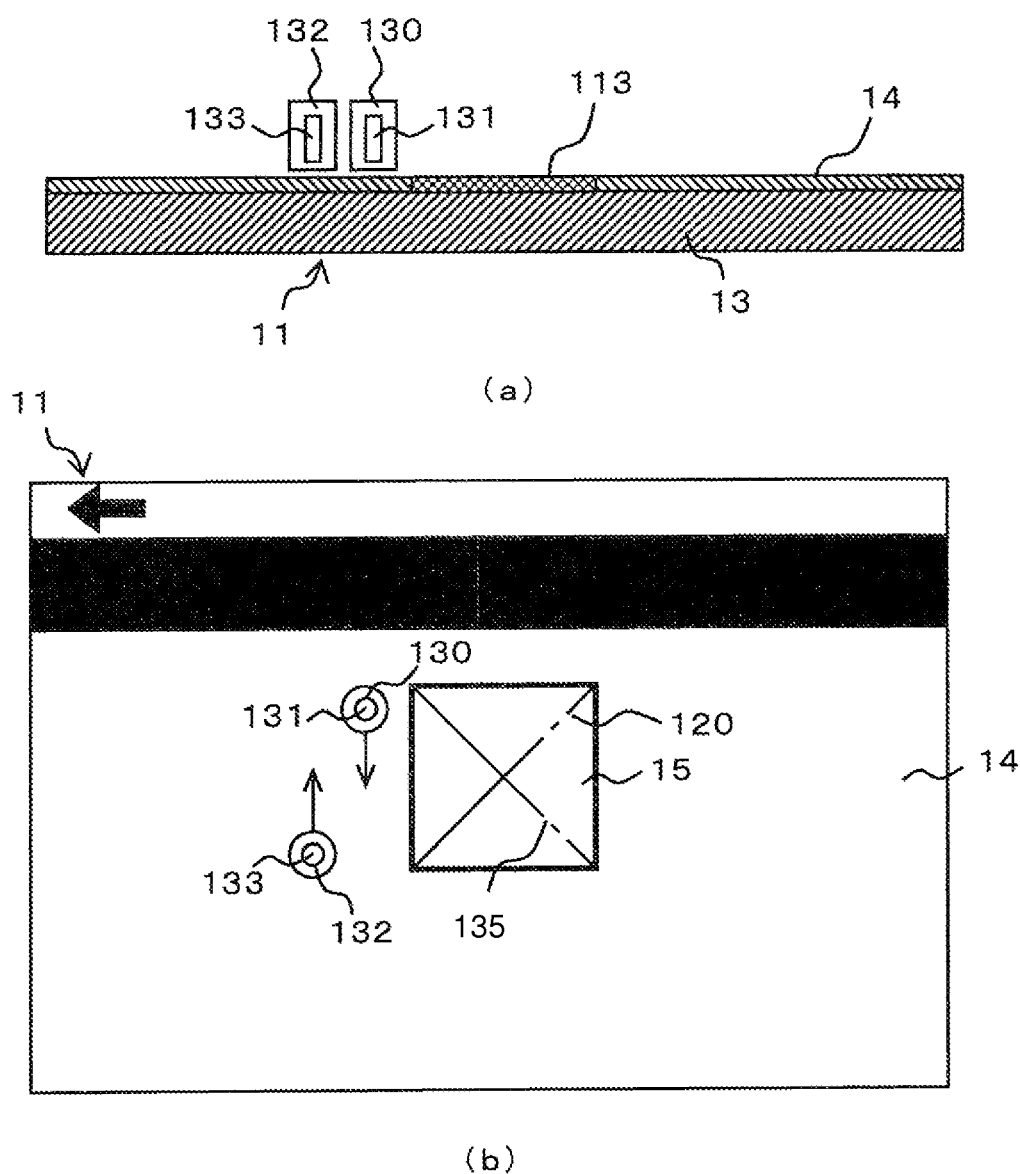
FIG. 26 shows a verifying chip reading device using two reading elements according to the present invention.

While a single reading element is used in the reading device shown in FIG. 25, a plurality of reading elements as shown in FIG. 26 allow the reading by a plurality of routes. As a result, the reliability of the reading can be increased. Because the information to be processed is linear information, this does not increase the load of processing.

FIG. 26(*a*) shows a general arrangement of the relation between the card and the reading device and FIG. 26(*b*) is a drawing to explain a detecting method. The card 11 is the same as the card 11 shown in FIG. 25, and detailed description on the card is not given here.

In this Example, in addition to a first reading device which comprises the reading element 131 and the container 130 as shown in FIG. 25, a second reading device is provided which comprises a reading element 132 and a container 133.

The second reading device composed of the reading element 132 and the container 133 moves in a direction reverse to the moving direction of the first reading device composed of the reading element 131 and the container 130. However, it can be so designed that the moving directions of the reading devices are the same.

FIG. 26(*b*) shows a typical example of the moving route. In this example, the first reading device and the second reading device move at the uniform speed in a direction indicated respectively as shown by arrow marks in FIG. 26(*b*) and move along linear routes 135 and 136 which are resulted from the movements synthesized with the moving direction of the card itself.

[The Reading Route]

Figure 27:
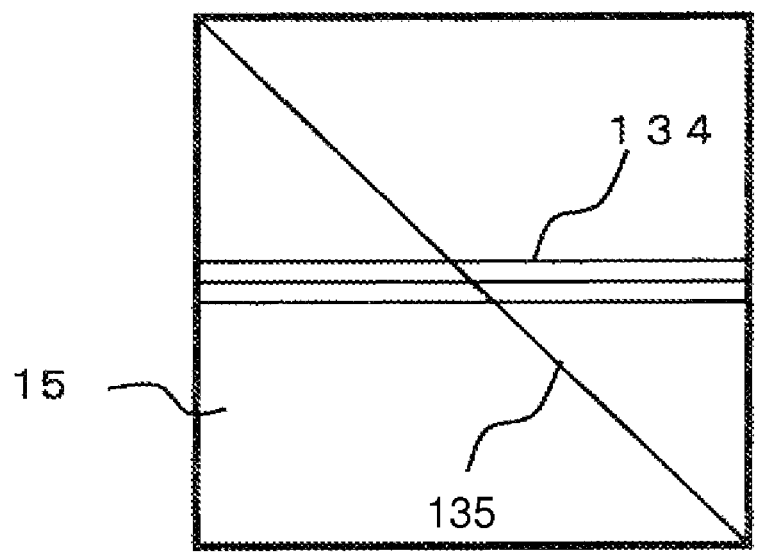
FIG. 27 shows an example of a reading route.

A reading error may be caused from an error in the route or from the operation failure of the reading device. In such the case, reading is performed by a plurality of reading elements at the same time as shown by the reference numeral 134 in FIG. 27. By finding an average value or by a value determined according to the majority value, the final reading information is determined.

[Embodiment 12 of the Reading Device]

Description will be given below on the cases where the reading devices shown in FIG. 25 to FIG. 28 are applied to the verifying chips shown in FIG. 12 and FIG. 16.

Figure 29:
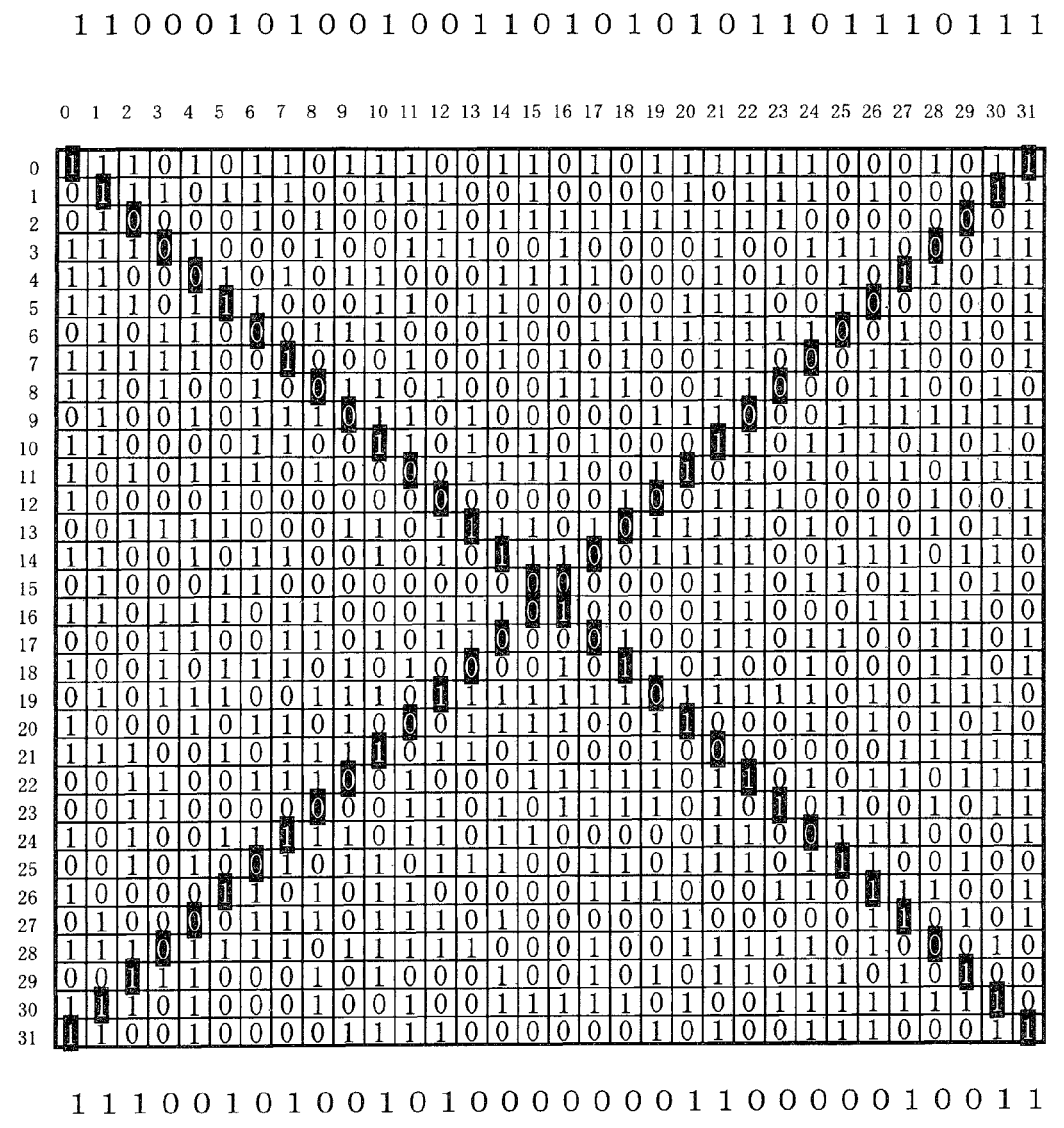

To facilitate the explanation, an example using binary numbers as shown in FIG. 12 is described referring to FIG. 29. This can also be applied in similar manner to the example using quaternary numbers as shown in FIG. 16.

In FIG. 29, authentication verifying data on a linear detecting route from the coordinate (0,0) to the coordinate (31,31) is shown as "1100010100100110101010101110111". Also, authentication verifying data on a linear detecting route from the coordinate (0,31) to the coordinate (31,0) is shown as "1110010100101000000011000010011".

The detecting route is not limited to the routes shown in FIG. 29. For instance, an arbitrary route shown in FIG. 28 may be adopted, or the route can be changed each time when the reading is performed.

Also, converting the coordinate can be made within the apparatus after the reading has been performed.

The combination of the data detecting routes as described above may result in a substantially large number as 32×32=1024, even under the condition that it does not turn back as the data detecting route. However, the information of the pattern to be stored in the reading apparatus for comparison is as small as 1024 bits.

Compared with the example of the binary numbers, the example of quaternary numbers shown in FIG. 16 is merely different in that the amount of information of the pattern for comparison is increased to 2048 bits, and then, detailed description is not given here.

[The Reading Route]

FIG. 28 shows several examples of the reading routes. FIGS. 28(*a*)-(*d*) each shows an example of using a single data reading route. FIGS. 28(*e*)-(*f*) each shows an example of using two data reading routes. Also, it may be possible to use three or more reading routes.

These reading routes can also be realized by selecting and changing the reading elements of arrays for detection as shown in FIG. 21 and FIG. 23. For instance, in the arrays shown in FIG. 21, when the detecting elements are read in the order of D00, D01, D02, D03, . . . D28, D29, D30 and D31, the route 135 as shown in FIG. 25 is obtained. The reading routes are not limited to these examples, and any arbitrary route can be adopted. Further, it is also possible to electrically read in irregular order.

Figure 30:
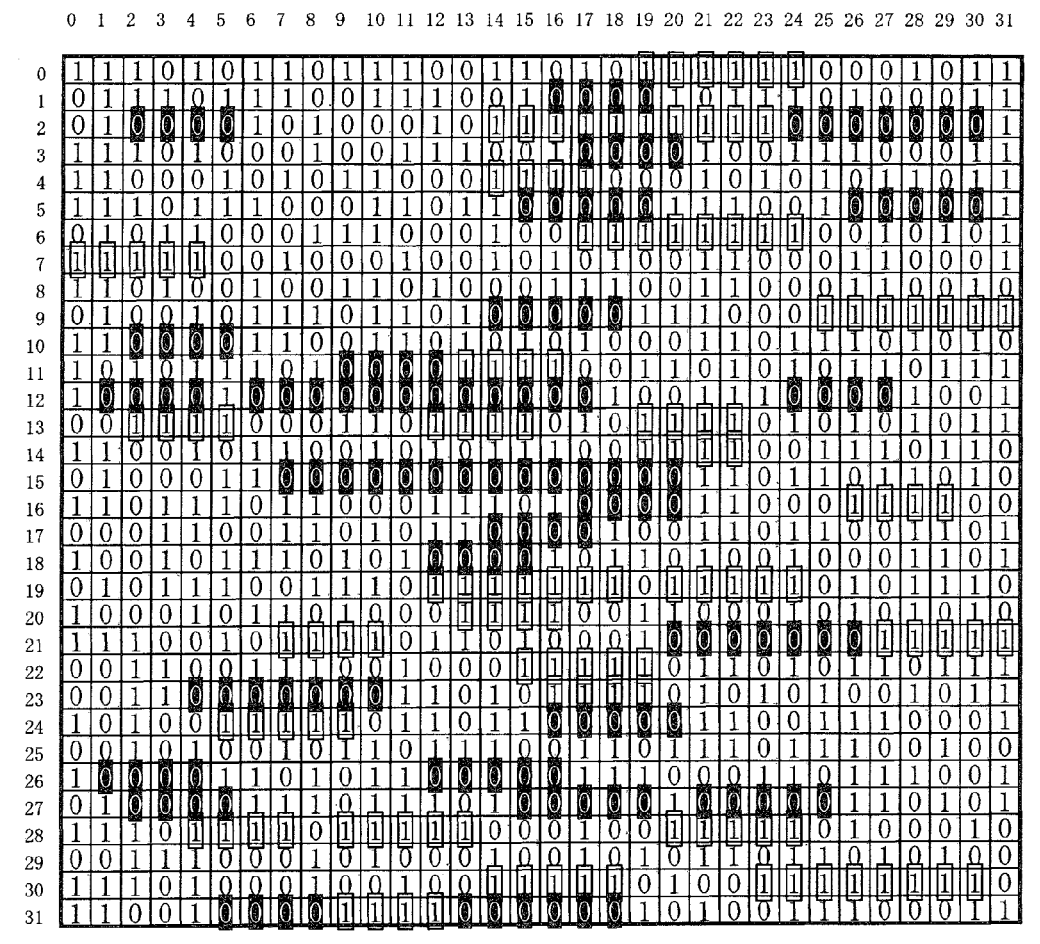

Description will be given below on a method for verifying the authenticity on the verifying chip as shown in FIG. 12 and FIG. 16 by applying the feature extraction method used in biometrics. Referring to FIG. 30, a method for verifying the authenticity on the verifying chip based on the binary number data of 0 and 1 shown in FIG. 12 is described. In FIG. 30, when the number "0" continuously appears in four or more times, the figures of "0" are shown as white-black inverted figures. Similarly, when the number "1" continuously appears in four or more times, the figures are shown as enclosed figures.

For instance, there are 13 occurrences of the figures "0000", starting from the coordinates (16,1).

There are 7 occurrences of "00000", starting from the coordinates (15,5).

There is one occurrence of "000000" at the coordinates (13,31). There are 3 occurrences of "0000000", starting from the coordinates (24,2). There is one occurrence of "000000000000" at the coordinates (6,12). There is one occurrence of "00000000000000" at the coordinates (7,15).

There are 12 occurrences of the figures "1111", starting from the coordinates (14,4). There are 8 occurrences of "11111", starting from the coordinates (0,7). There is one occurrence of "111111" at the coordinates (19,1). There is one occurrence of "1111111" at the coordinates (12,19). There are 2 occurrences of "11111111", starting from the coordinates (17,6). There is one occurrence of "1111111111" at the coordinates (14,3).

By detecting each of these features and by detecting coordinates of the starting positions of these features, the authenticity can be verified on the verifying chip.

[Embodiment 13 of the Reading Device]

Figure 31:
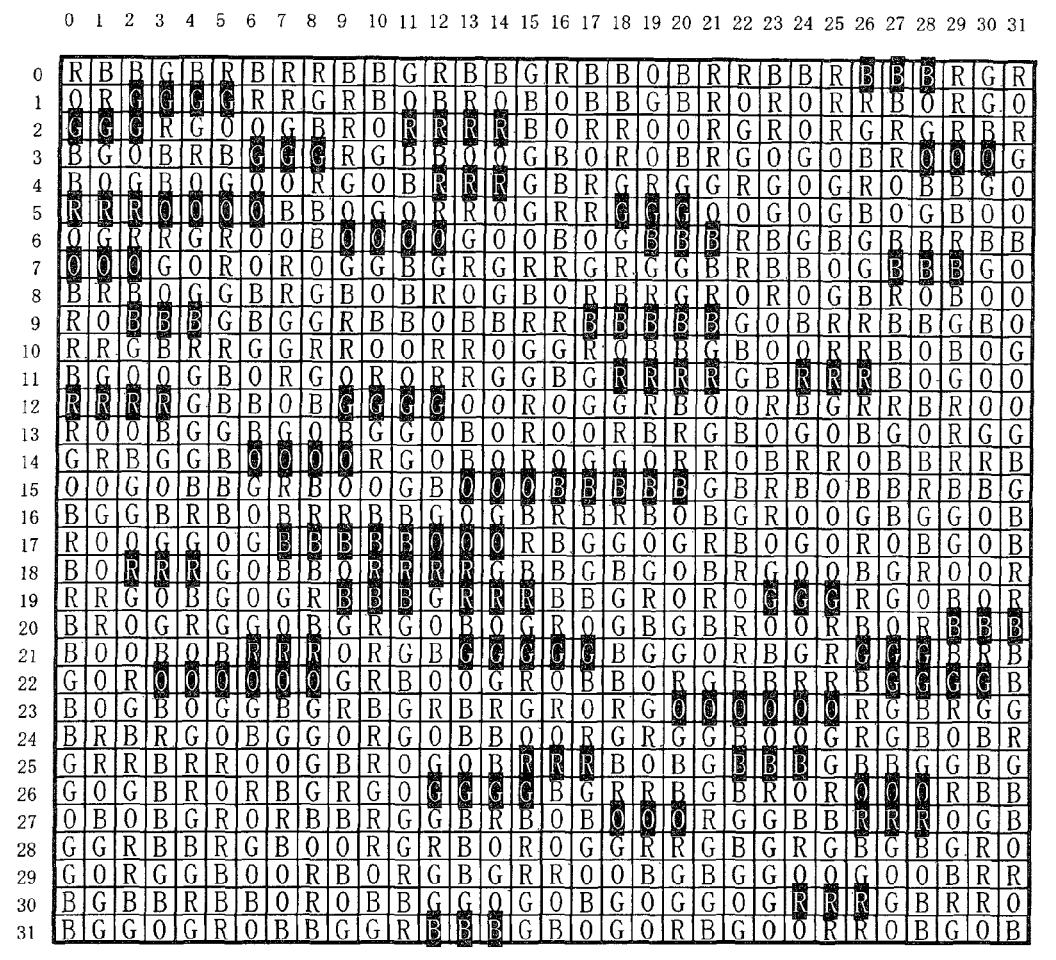

Referring to FIG. 31, a method for verifying the authenticity on the verifying chip based on quaternary numbers shown in FIG. 16 is described. As shown in FIG. 16, as the features in the matrix, there are 5 occurrences of the figures "000", 3 occurrences of "0000", 0 occurrence of "00000" and 2 occurrences of "000000", aligned in the transverse direction.

Also, there are 9 occurrences of "RRR", four occurrences of "RRRR" and 0 occurrence of "RRRRR" aligned in the transverse direction.

Further, there are 5 occurrences of "GGG", 4 occurrences of "GGGG" and 1 occurrence of "GGGGG" aligned in the transverse direction.

Also, there are 8 occurrences of "BBB", 0 occurrence of "BBBB" and 3 occurrences of "BBBBB" aligned in the transverse direction.

By detecting each of these features and by detecting the coordinates of the starting positions of these, the authenticity can be verified on the verifying chip. As the feature to be extracted, in addition to the same verifying data aligned in the transverse direction, the same verifying data aligned in the longitudinal direction or the same verifying data aligned in a hooked form may be used. Further, specific arrangement such as "ORGB" of different information may be also used.

Also, in case of using the binary data, when adopting intermediate data, e.g., intermediate two gray colors in the white-black binary data, it is possible to be of quaternary numbers. These arrangements, as described above, make carrying out forgery more difficult. Also, when using some of "0" in the binary data for the intermediate color tone as dummies, this will further embarrass those who attempt to forge.

The intermediate color tone can be similarly used in the case where the quaternary data such as 0, R, G and B is used, and this makes it possible to be of 3-bit octal numbers, 4-bit hexadecimal numbers, etc.

The authentication verifying methods as described above are to digitally process the authentication verifying data recorded digitally. FIG. 32 shows an arrangement of analog processing of authentication verifying data which has been digitally recorded.

In FIG. 32, the pattern of the verifying chip as shown in FIG. 32(a) is scanned, for instance, along the routes shown by the reference numerals 135 and 136 by using the verifying chip reading device as shown in FIG. 25 or FIG. 26 and electric signals shown in FIG. 32(b) and FIG. 32(c) are obtained. By comparing these electric signals patterns with the valid patterns as stored, a unit for identifying the card authenticity is verified and the card itself can be authenticated.

[Embodiment 14 of the Reading Device]

Physical standards for a cash card and a credit card are strictly stipulated from the viewpoint of the practical use. Accordingly, physical standards of the components to be mounted on it are also strictly provided. Notwithstanding, it is not entirely deniable that deformation may occur due to the excessive use.

Figure 33:
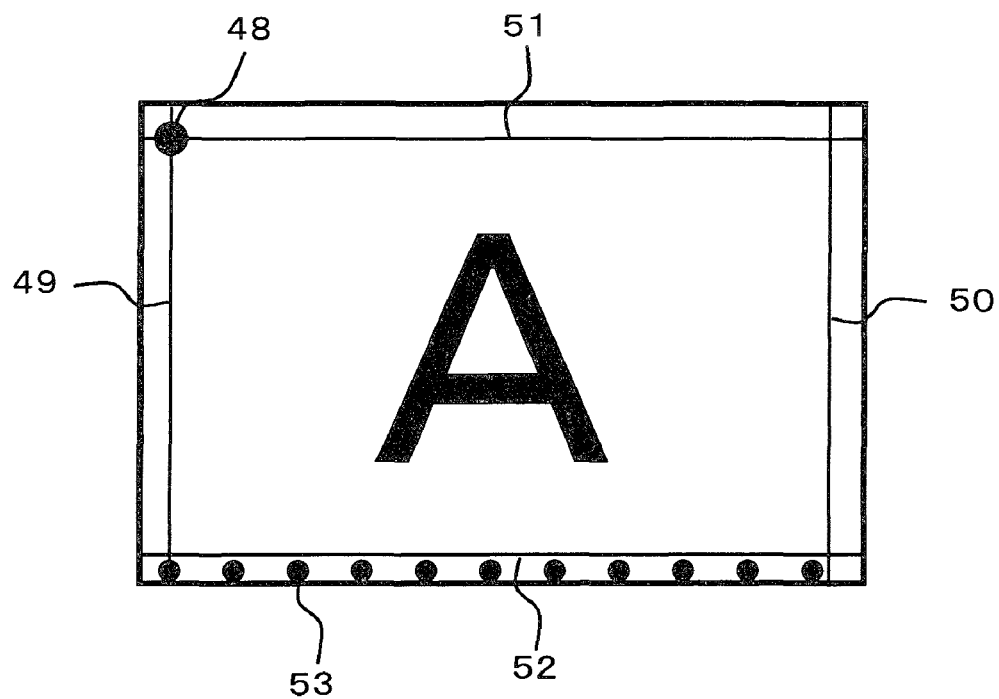
FIG. 33 shows an example of a mark for position alignment, a reading start line, a reading finish line, and a mark for synchronization signal.

To cope with such the problem, it is desirable to arrange a position alignment mark 48 as shown in FIG. 33 on the verifying chip. In the simplest case, only one position alignment mark may be used. Preferably, two or more marks are provided to ensure the more reliable position alignment.

The position alignment mark is useful not only for the reading in the linear shape but also for the reading in the planar shape using the image pickup device.

In order to perform the reading more reliably, at the same time with the use of the position alignment mark, it would be desirable to arrange some other marks at the position to start the reading and the position to finish the reading of the unit for identifying the card. For instance, a line 49 to start the reading in moving direction and a line 50 to finish the reading in moving direction and further, lines 51 and 52 to indicate the end portions may be arranged.

The reading of information on the card identifying unit is performed by the relative movement of the card identifying unit and the reading device. To ensure the reliable reading, it is necessary to synchronize the movements of the card identifying unit and the reading device. If a mark 53 for synchronization signal is disposed on the card identifying unit, the movement of the reading device can be synchronized according to the reading of the mark.

Also, the reading start line and the reading finish line and/or the mark for synchronization signal can be used for the normalization of the signal in the signal processing.

The position alignment mark, the reading start/finish lines and/or the mark for synchronization signal are made of fluorescent substance particles, and these particles can be prepared by an adequate printing means such as an ink jet printer.

[Embodiment 1 of the Processing Flow]

Figure 34:
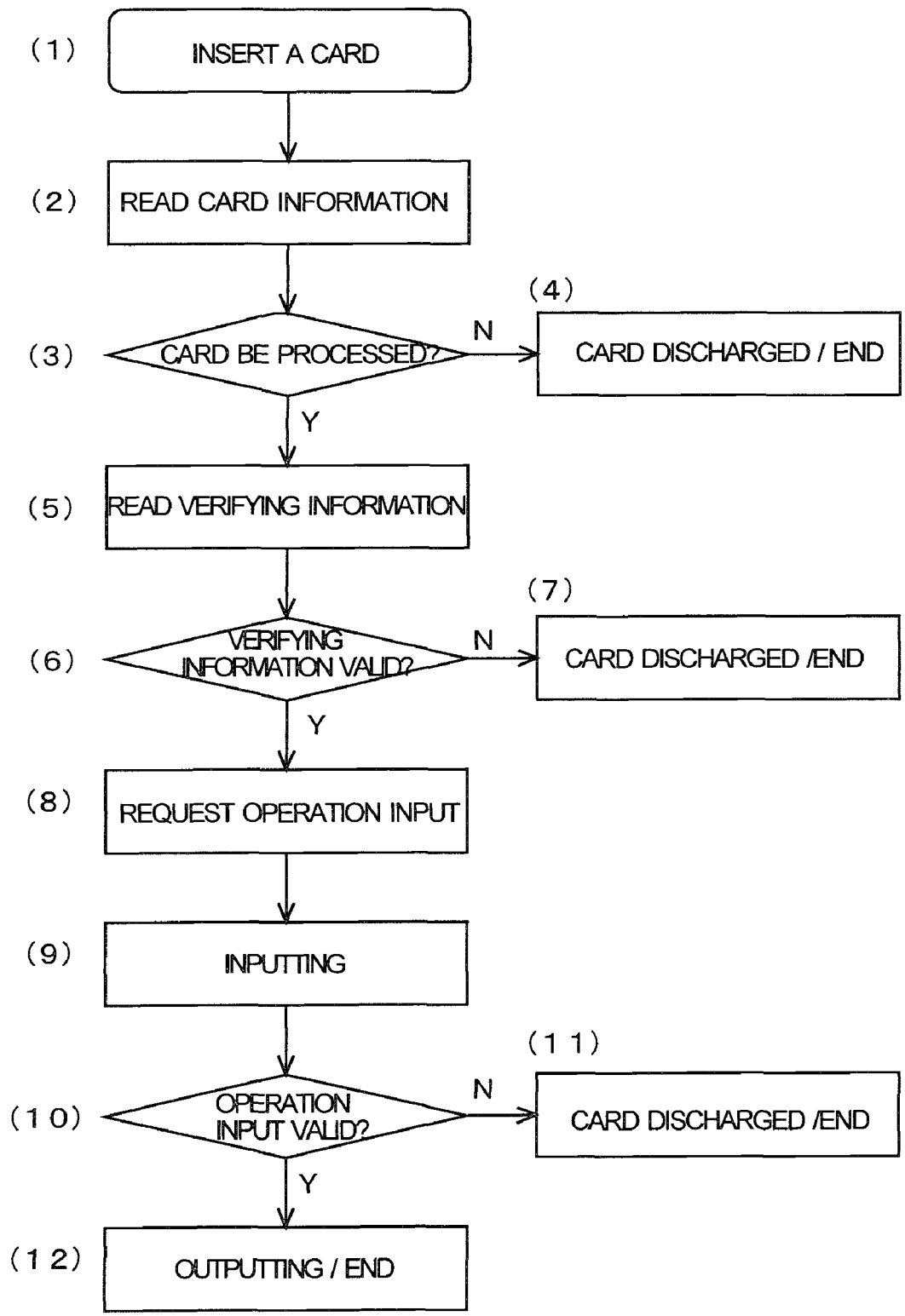
FIG. 34 shows an example of a flow of card authentication verifying processing.
Figure 35:
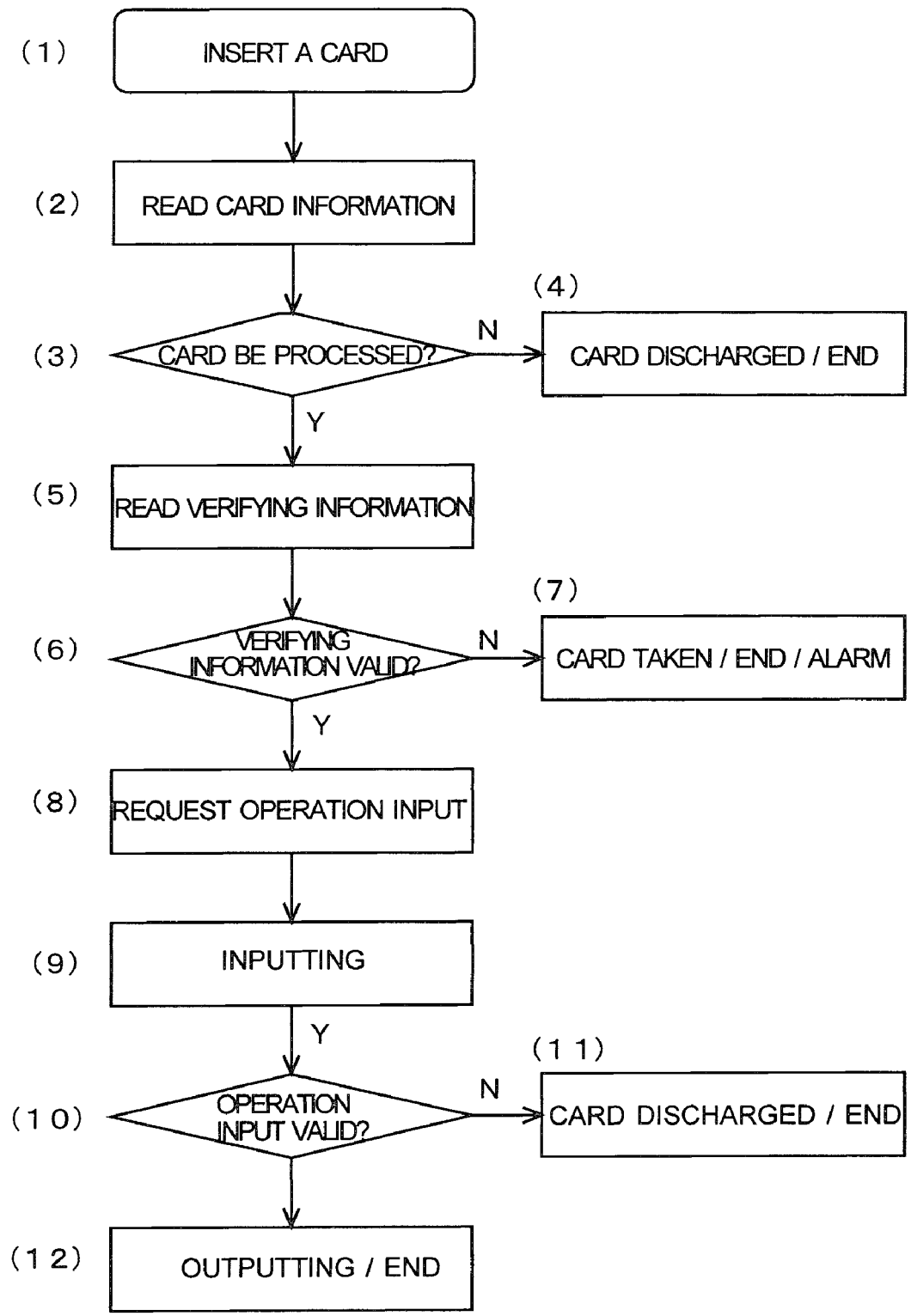
FIG. 35 shows another example of a flow of card authentication verifying processing.
Figure 36:
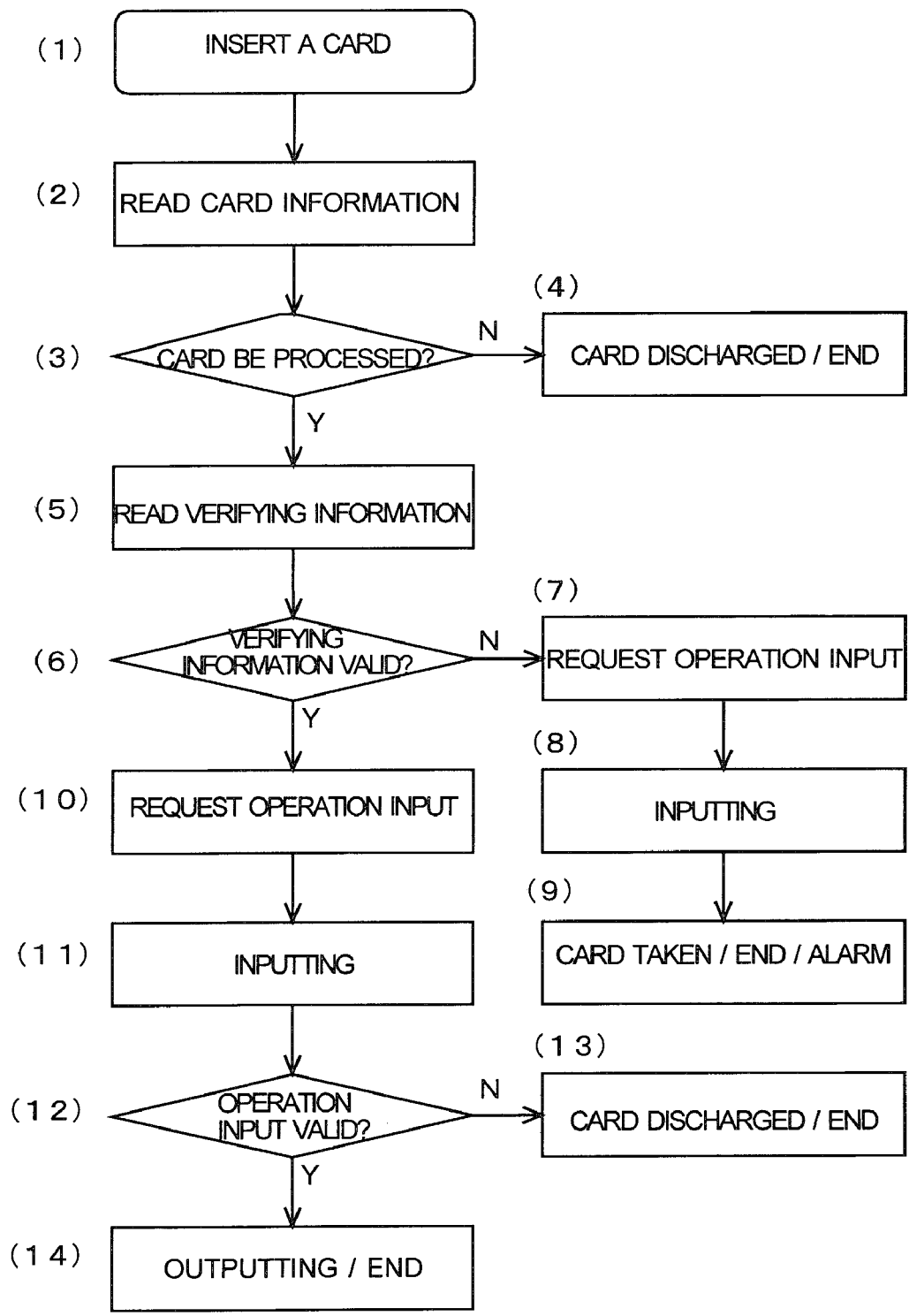
FIG. 36 shows still another example of a flow of card authentication verifying processing.

FIG. 34 to FIG. 36 each shows an example of a flow of card authentication verifying processing. FIG. 34 shows Embodiment 1 of a basic arrangement.

(1) A card user inserts a cash card into a card slot of a terminal device such as an ATM by setting the portion of the card marked with an arrow at the foremost position, the sensor at the card slot senses it, and the card is taken into the device.

(2) When the card is taken into the device, the terminal device reads the card information from the magnetic recording portion of the card.

(3) The terminal device judges whether the inserted card is a valid card which can be processed by the terminal device or not.

(4) If it is not confirmed that the card can be processed by the device from the card information thus read, or if the information of the card cannot be read because the card is broken or stained even though it is a valid card, the terminal device judges that it is an illegitimate card which cannot be processed and discharges the card.

(5) The terminal device reads the authentication verifying data from the verifying chip by mechanical scanning using the movement of the card when the card is taken into the device or under the stopped condition after the card is taken in.

(6) The terminal device judges whether the card authentication verifying data thus read is valid or not.

(7) In a case where the terminal device judges that the card authentication verifying data is not valid, it is judged that the inserted card is not a valid card. Then, the card is discharged from the terminal device, and the processing is terminated.

The judgment on the validity of the authentication verifying data and subsequent processing of the card may be carried out in parallel with the other processing.

(8) In a case where the terminal device judges that the card authentication verifying data is valid, it instructs the user to perform further input operations, for example, input on the amount to draw.

(9) The user follows the instruction and performs the input operation such as the inputting of the amount to be paid.

(10) The host computer judges whether the content of the input operation such as the amount to be paid is adequate or not.

(11) If the host computer judges that the content of the input operation is inadequate, for example, the balance short in the deposit, the card is discharged from the device, and the processing is terminated.

(12) When the host computer judges that the content of the input operation such as the amount to be paid is adequate, the output operation such as paying of the amount is performed. Then, the card is discharged from the terminal device and the processing is terminated.

[Embodiment 2 of the Processing Flow]

Referring to FIG. 35, Embodiment 2 of the flow of the card authentication verifying process is described.

In the flow of the card authentication verifying process, if the card authentication verifying data is not valid, the card is discharged from the terminal device in the example as shown in FIG. 34. In the Embodiment 2, if the authentication verifying data is not valid, the card is taken into the terminal device, and an alarm is given. In so doing, it can be easy to dig up the illegitimate card.

(1) When a card user inserts a cash card into a card slot of a terminal device such as an ATM by setting the portion of the card marked with an arrow at the foremost position, the sensor at the card slot senses it, and the card is taken into the device.

(2) When the card is taken into the device, the terminal device reads the card information from the magnetic recording portion of the card.

(3) The terminal device judges whether the inserted card is a valid card which can be processed by the terminal device or not.

(4) If it is not confirmed that the card can be processed by the device from the card information thus read, or if the information of the card cannot be read because the card is broken or stained even though it is a valid card, the terminal device judges that it is an illegitimate card which cannot be processed and discharges the card.

(5) The terminal device reads the authentication verifying data from the verifying chip by mechanical scanning using the movement of the card when the card is taken into the device or under the stopped condition after the card is taken in.

(6) The terminal device judges whether the card authentication verifying data thus read is valid or not.

(7) In a case where the terminal device judges that the card authentication verifying data is not valid, it is judged that the inserted card is not a valid card. Then, the card is taken into the device, and the alarm is given.

It may be possible that the alarm is issued only at a place remote from the terminal device, and a message of operation failure is displayed on the terminal device. This makes it easy to have the user of the illegitimate card under control.

The judgment on the validity of the authentication verifying data and subsequent processing of the card may be carried out in parallel with the other processing.

(8) In a case where the terminal device judges that the card authentication verifying data is valid, it instructs the user to perform further input operations, for example, input on the amount to draw.

(9) The user follows the instruction and performs the input operation such as the inputting of the amount to be paid.

(10) The host computer judges whether the content of the input operation such as the amount to be paid is adequate or not.

(11) If the host computer judges that the content of the input operation is inadequate, for example, the balance short in the deposit, the card is discharged from the device, and the processing is terminated.

(12) When the host computer judges that the content of the input operation such as the amount to be paid is adequate, output operation such as paying of the amount is performed. Then, the card is discharged from the terminal device and the processing is terminated.

[Embodiment 3 of the Processing Flow]

Referring to FIG. 36, Embodiment 3 of the flow of the card authentication verifying process is described. In the flow of the card authentication verifying process, while if the card authentication verifying data is not valid, the card is quickly taken into the terminal device and an alarm is given in the Embodiment 2 as shown in FIG. 35, if the authentication verifying data is not valid, the process to use the card continues in the Embodiment 3. In so doing, it can be easy to dig up the use of the illegitimate card.

(1) A card user inserts a cash card into a card slot of a terminal device such as an ATM by setting the portion of the card marked with an arrow at the foremost position. Then, the sensor at the card slot senses it, and the card is taken into the device.

(2) When the card is taken into the device, the terminal device reads the card information from the magnetic recording portion of the card.

(3) The terminal device judges whether the inserted card is a valid card which can be processed by the terminal device or not.

(4) If it is not confirmed that the card can be processed by the device from the card information thus read, or if the information of the card cannot be read because the card is broken or stained even though it is a valid card, the terminal device judges that it is an illegitimate card which cannot be processed and discharges the card.

(5) The terminal device reads the authentication verifying data from the verifying chip by mechanical scanning using the movement of the card when the card is taken into the device or under the stopped condition after the card is taken in.

(6) The terminal device judges whether the card authentication verifying data thus read is valid or not.

(7) In a case where the terminal device judges that the card authentication verifying data is not valid, it instructs the user to perform further input operations, for example, input on the amount to draw.

The judgment on the validity of the authentication verifying data and subsequent processing of the card may be carried out in parallel with the other processing.

(8) The user follows the instruction and performs the input operation such as the inputting of the amount to be paid.

(9) Then, the card is taken into the terminal device, and an alarm is given.

It may be arranged that the alarm is issued only at a place remote from the terminal device, and a message of operation failure is displayed on the terminal device. This makes it easy to have the user of the illegitimate card under control.

(10) In a case where the terminal device judges that card authentication verifying data is valid, it instructs the user to perform further input operations such as the input of the amount to draw.

(11) The user follows the instruction and performs the input operation such as the input of the amount to be paid.

(12) The host computer judges whether the content of the input operation such as the amount to be paid is adequate or not.

(14) If the host computer judges that the content of the input operation is inadequate, for example, the balance short in the deposit, the card is discharged from the device, and the processing is terminated.

With the arrangement as described above, the time, during which the user who uses the illegitimate card uses the terminal device, can be extended. This means not only that gives longer time for capturing the card user, but also that makes it possible to obtain further evidence such as the user's fingerprints by the input operation. If a contact-type touch switch is adopted, this makes the taking of fingerprints much easier.

Physical standards for a cash card and a credit card are strictly stipulated from the viewpoint of the practical use. Accordingly, physical standards of the components to be mounted on it are also strictly provided. However, it is not entirely deniable that deformation may occur due to the excessive use.

Industrial Applicability

The card authentication verifying chip and the card with the card authentication verifying chip as described above can be adopted in the applications such as bank cash cards, credit cards, prepaid cards, membership cards, securities, ID cards, admission allowance and other types of certificate.

A chip made of a natural material or an artificial material in which the interference of incident light and reflected light causes an optical pattern, similarly to a case of the embossed hologram chip, and which is nacreous or iridescent may be adopted in place of the embossed hologram chip.

The invention claimed is:

1. A card comprising a base plate and an authentication verifying chip, wherein said verifying chip is layered on said base plate and includes an embossed hologram, said embossed hologram having pits of different depths and a portion without said pits, the different depths of said pits respectively corresponding to a ¼ wavelength of a plurality of incident lights of different wavelengths.

2. The card according to claim 1, wherein said pits are disposed perpendicularly to a surface of said chip.

3. The card according to claim 1, wherein said pits are disposed inclined to a surface of said chip.

4. The card according to claim 1, wherein said pits are arranged at regular intervals.

5. The card according to claim 4, wherein said pits are arranged based on binary true random numbers.

6. The card according to claim 5, wherein said pits are a part of the pits arranged based on binary true random numbers.

7. The card according to claim 4, wherein said pits are arranged based on quaternary true random numbers.

8. The card according to claim 7, wherein said pits are a part of the pits arranged based on quaternary true random numbers.

9. The card according to claim 1, wherein a mark for reading position alignment is further provided on said verifying chip.

10. The card according to claim 9, wherein said mark for reading position alignment provided is one mark.

11. The card according to claim 9, wherein a plurality of marks for reading position alignment are disposed on said verifying chip.

12. The card according to claim 9, wherein a line to start the reading, a line to finish the reading and a line to indicate the end portion are provided.

13. The card according to claim 9, 10, 11 or 12, wherein a mark for synchronization signal is further provided.

14. The card according to claim 1, wherein said pits are arranged with an adequate distance to each other.

15. An embossed hologram reading device for reading an embossed hologram having pits of different depths and a portion without the pits on an authentication verifying chip mounted on a card, wherein said reading device includes at least one light source for a plurality of incident lights of different wavelengths for irradiating said authentication verifying chip and an image pickup device for photographing a plurality of images of a plurality of wavelengths of said authentication verifying chip thus irradiated, the different depths of the pits respectively corresponding to a ¼ wavelength of the plurality of incident lights of different wavelengths.

16. An embossed hologram reading device for reading an embossed hologram having pits of different depths and a portion without the pits on an authentication verifying chip mounted on a card, wherein said reading device includes a light emitting/detecting elements matrix for a plurality of incident lights of different wavelengths with the same area as said verifying chip, the different depths of the pits respectively corresponding to a ¼ wavelength of the plurality of incident lights of different wavelengths.

17. An embossed hologram reading device for reading an embossed hologram having pits of different depths and a portion without the pits on an authentication verifying chip mounted on a card, wherein said reading device includes at least one light emitting/detecting elements array for a plurality of incident lights of different wavelengths with the same width as said verifying chip, the different depths of the pits respectively corresponding to a ¼ wavelength of the plurality of incident lights of different wavelengths.

18. An embossed hologram reading device for reading an embossed hologram having pits of different depths and a portion without the pits on an authentication verifying chip mounted on a card, wherein said embossed hologram reading device includes a set of light emitting/detecting elements, for a plurality of incident lights of different wavelengths, movable in a direction of a width of said verifying chip and said light emitting/detecting elements read the embossed hologram while the embossed hologram is moving.

19. The embossed hologram reading device according to claim 18, wherein said reading device has more than one set of light emitting/detecting elements for the plurality of incident lights of different wavelengths.

* * * * *